US012226693B2

(12) United States Patent
Lin

(10) Patent No.: US 12,226,693 B2
(45) Date of Patent: Feb. 18, 2025

(54) OBJECT PROMPTING METHOD, APPARATUS, AND DEVICE IN VIRTUAL SCENE, AND STORAGE MEDIUM

(71) Applicant: Tencent Technology (Shenzhen) Company Limited, Shenzhen (CN)

(72) Inventor: Lingyun Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 304 days.

(21) Appl. No.: 17/944,070

(22) Filed: Sep. 13, 2022

(65) Prior Publication Data

US 2023/0019749 A1 Jan. 19, 2023

Related U.S. Application Data

(63) Continuation of application No. PCT/CN2021/116012, filed on Sep. 1, 2021.

(30) Foreign Application Priority Data

Sep. 10, 2020 (CN) .......................... 202010949552.2

(51) Int. Cl.
A63F 13/537 (2014.01)
A63F 13/525 (2014.01)
(52) U.S. Cl.
CPC .......... *A63F 13/537* (2014.09); *A63F 13/525* (2014.09)
(58) Field of Classification Search
CPC .. A63F 13/537; A63F 13/533; A63F 13/5375; A63F 13/5372
See application file for complete search history.

(56) References Cited

U.S. PATENT DOCUMENTS 9,348,488 B1* 5/2016 Renema, II ......... G06F 3/04817
9,952,755 B2* 4/2018 Ogiso ................. G06F 3/04845
(Continued)

FOREIGN PATENT DOCUMENTS

CN 107890673 A 4/2018
CN 108499104 A 9/2018
(Continued)

OTHER PUBLICATIONS

Itsjerian, "All The New Changes From The Secret Update!—Fortnite Battle Royale", Apr. 15, 2020, Youtube.com, pp. 1-3, at https://www.youtube.com/watch?v=4f_SD8ahpCY (last visited Sep. 10, 2024). (Year: 2020).*
(Continued)

*Primary Examiner* — Steve Rowland
(74) *Attorney, Agent, or Firm* — Morgan, Lewis & Bockius LLP

(57) ABSTRACT

An object prompting method includes: displaying a virtual scene picture and superimposing and displaying compass information on the virtual scene picture, a first azimuth scale in the compass information indicates an orientation of the first virtual object in the virtual scene; and displaying an object prompt identifier in response to a sound source object producing a sound in the virtual scene, the object prompt identifier indicates a presence of a sound source producing a sound in a direction corresponding to a second azimuth scale in the compass information. The foregoing method overcomes issues associated with a display of an object prompt identifier being limited by a display region area, a display effect of an object prompt identifier of a sound source object is improved, such that an interaction efficiency of a virtual scene interface is also improved.

17 Claims, 15 Drawing Sheets

(56) References Cited

U.S. PATENT DOCUMENTS

| | | | |
|---|---|---|---|
| 10,603,589 B2* | 3/2020 | Miyamoto | A63F 13/56 |
| 2001/0046896 A1* | 11/2001 | Miyamoto | A63F 13/5252 |
| | | | 463/31 |
| 2011/0172013 A1* | 7/2011 | Shirasaka | A63F 13/92 |
| | | | 345/173 |
| 2011/0283865 A1* | 11/2011 | Collins | G06F 3/16 |
| | | | 84/464 R |
| 2012/0142429 A1* | 6/2012 | Muller | A63F 13/69 |
| | | | 463/42 |
| 2018/0024660 A1* | 1/2018 | Wang | G06F 3/04817 |
| | | | 273/110 |
| 2018/0164801 A1* | 6/2018 | Kim | G08G 5/0013 |
| 2019/0126148 A1* | 5/2019 | Wei | A63F 13/2145 |
| 2019/0126151 A1 | 5/2019 | Li | |
| 2020/0408521 A1* | 12/2020 | Lyons | G06F 3/04847 |
| 2021/0379491 A1* | 12/2021 | Liu | A63F 13/537 |

FOREIGN PATENT DOCUMENTS

| | | |
|---|---|---|
| CN | 108704316 A | 10/2018 |
| CN | 110917616 A | 3/2020 |
| CN | 112044069 A | 12/2020 |
| KR | 101986726 B1 | 6/2019 |

OTHER PUBLICATIONS

Tencent Technology, ISR, PCT/CN2021/116012, Dec. 2, 2021, 2 pgs.
Airdrop Brother, "Visualization of Sound Intelligence, Teach You How to Understand the Logo of the Minimap!", Mar. 13, 2020, 4 pgs., Retrieved from the Internet: https://gp.qq.com/gicp/news/684/9809621.html.
Tencent Technology, WO, PCT/CN2021/116012, Dec. 2, 2021, 4 pgs.
Tencent Technology, IPRP, PCT/CN2021/116012, Mar. 7, 2023, 5 pgs.

* cited by examiner

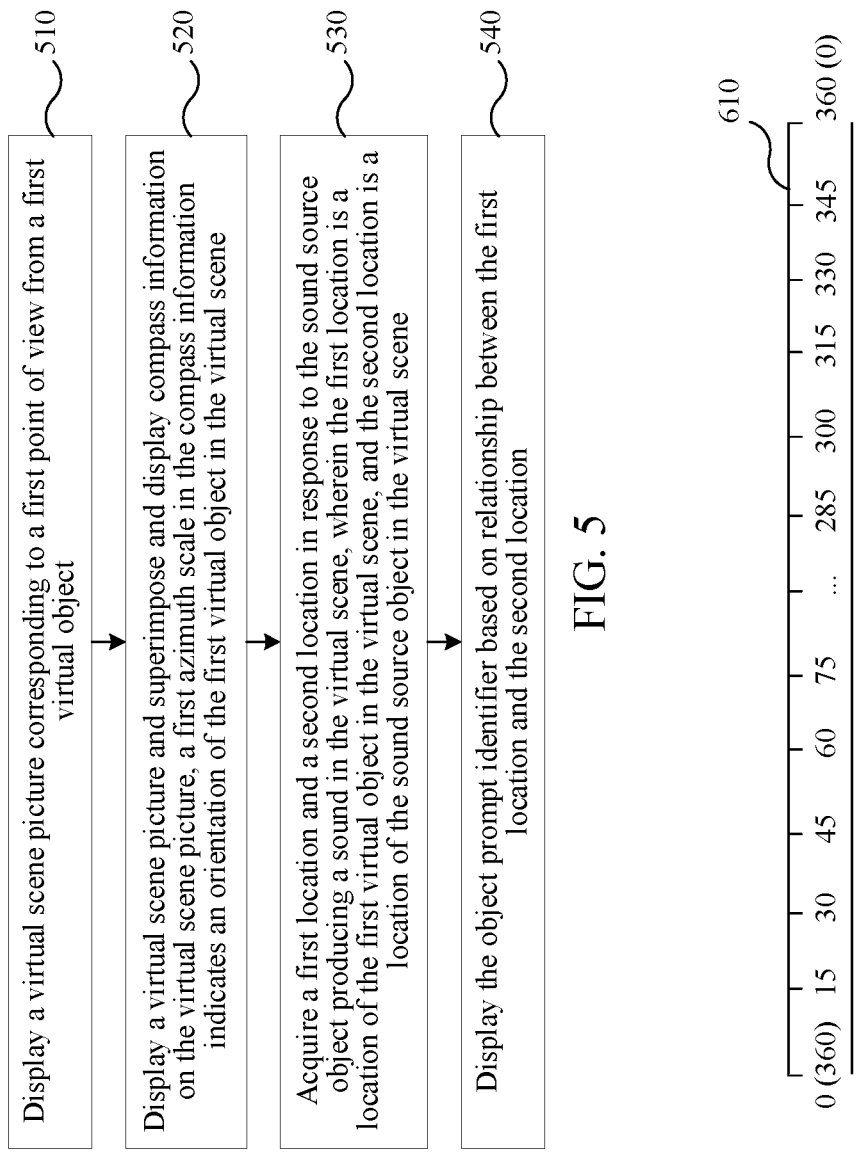

OBJECT PROMPTING METHOD, APPARATUS, AND DEVICE IN VIRTUAL SCENE, AND STORAGE MEDIUM

CROSS-REFERENCE TO RELATED APPLICATIONS

This application is a continuation application of PCT Patent Application No. PCT/CN2021/116012, entitled "PROMPT METHOD AND APPARATUS FOR OBJECT IN VIRTUAL SCENE, AND DEVICE AND STORAGE MEDIUM" filed on Sep. 1, 2021, which claims priority to Chinese Patent Application No. 202010949552.2, filed with the State Intellectual Property Office of the People's Republic of China on Sep. 10, 2020, and entitled "OBJECT PROMPTING METHOD, APPARATUS, AND DEVICE IN VIRTUAL SCENE, AND STORAGE MEDIUM", all of which are incorporated herein by reference in their entirety.

FIELD OF THE TECHNOLOGY

This application relates to the field of network technologies, and in particular, to an object prompting method, apparatus, and device in a virtual scene, and a storage medium.

BACKGROUND OF THE DISCLOSURE

In many applications (such as a virtual reality application program, a three-dimensional map program, a military emulation program, a first-person shooting game, and a multiplayer online tactical game) constructed with a virtual scene, an object prompt identifier used for indicating a sound source object may be displayed in the virtual scene, so as to prompt a location of a virtual object.

A small map is generally superimposed and displayed on an upper layer of a virtual scene picture. In a related technology, an object prompt identifier used for indicating a sound source object is generally displayed on the small map, so that a user can determine a location of a virtual object in the virtual scene by observing the object prompt identifier in the small map.

However, because a design area of the small map in the virtual scene picture is generally relatively small, and a display location is relatively close to an edge of the virtual scene picture, a display effect of the object prompt identifier is poor, a prompt effect on the location of the virtual object is affected, and interaction efficiency of a virtual scene interface is further affected.

SUMMARY

Embodiments of this application provide an object prompting method, apparatus, and device in a virtual scene, and a storage medium, which can improve a display effect of an object prompt identifier of a sound source object. The technical solutions are as follows.

According to one aspect, an object prompting method in a virtual scene is provided, where the method includes:
  displaying a virtual scene picture corresponding to a first point of view from a first virtual object;
  superimposing and displaying compass information on the virtual scene picture, a first azimuth scale in the compass information indicates an orientation of the first virtual object in the virtual scene; and
  displaying an object prompt identifier in response to a sound source object producing a sound in the virtual scene, the object prompt identifier indicates a presence of a sound source producing a sound in a direction corresponding to a second azimuth scale in the compass information.

According to another aspect, an object prompting apparatus in a virtual scene is provided, where the apparatus includes:
  a picture display module, configured to display a virtual scene picture corresponding to a first point of view from a first virtual object;
  a compass information display module, configured to superimpose and display compass information on the virtual scene picture, a first azimuth scale in the compass information indicates an orientation of the first virtual object in the virtual scene; and
  an identifier display module, configured to display an object prompt identifier in response to a sound source object producing a sound in the virtual scene, the object prompt identifier indicates a presence of a sound source producing a sound in a direction corresponding to a second azimuth scale in the compass information.

In a possible implementation, the identifier display module includes:
  a location acquiring submodule, configured to: acquire a first location and a second location in response to the sound source object producing a sound in the virtual scene, the first location being a location of the first virtual object in the virtual scene, and the second location being a location of the sound source object in the virtual scene; and
  a first identifier display submodule, configured to display the object prompt identifier based on a relationship (e.g., a location relationship) between the first location and the second location.

In a possible implementation, the relationship between the first location and the second location includes a distance relationship and an azimuthal relationship; and
  the first identifier display submodule includes:
  a display attribute determining unit, configured to determine a display attribute of the object prompt identifier based on the distance relationship between the first location and the second location;
  a scale determining unit, configured to determine the second azimuth scale based on the azimuthal relationship between the first location and the second location; and
  a first identifier display unit, configured to display the object prompt identifier according to the display attribute and the second azimuth scale.

In a possible implementation, the display attribute determining unit includes:
  a target distance acquiring subunit, configured to acquire a target distance between the first location and the second location; and
  a display attribute determining subunit, configured to determine, according to a mapping relationship between the target distance and the display attribute, the display attribute of the object prompt identifier in the compass information.

In a possible implementation, the display attribute includes at least one of a size of the object prompt identifier, a display transparency of the object prompt identifier, a color of the object prompt identifier, and a display shape of the object prompt identifier.

In a possible implementation, the scale determining unit includes:
  an azimuth angle acquiring subunit, configured to acquire an azimuth angle of the second location relative to the first location; and
  a scale determining subunit, configured to determine the second azimuth scale based on the azimuth angle.

In a possible implementation, the first identifier display unit is configured to: in accordance with a determination that the azimuth angle exceeds a display angle threshold of the compass information: display object prompt identifier indication information according to the display attribute and the second azimuth scale. The object prompt identifier indication information indicates that the object prompt identifier exists outside the display angle threshold of the compass information. The display angle threshold indicates a maximum angle range that can be displayed by the compass information that centers on the orientation of the first virtual object.

In a possible implementation, in response to the sound source object being a second virtual object, the identifier display module includes:
  a camp acquiring submodule, configured to acquire, in response to the second virtual object in the virtual scene producing a sound, a camp to which each of the first virtual object and the second virtual object belongs; and
  a second identifier display submodule, configured to display the object prompt identifier in response to that the first virtual object and the second virtual object are in different camps.

In a possible implementation, the first identifier display submodule includes:
  a sound type acquiring unit, configured to acquire a sound type of a sound signal produced by the second virtual object; the sound type indicates a production manner of the sound signal; and
  a second identifier display unit, configured to display the object prompt identifier according to the sound type and based on the relationship between the first location and the second location;
  different sound types being corresponding to different types of object prompt identifiers.

In a possible implementation, the first identifier display submodule is configured to refresh and display the object prompt identifier based on a time interval at which the sound source object produces sounds and the relationship between the first location and the second location.

In a possible implementation, the apparatus further includes:
  a deletion module, configured to delete the object prompt identifier in response to that a time length in which the object prompt identifier is not refreshed and displayed exceeds a time length threshold.

In a possible implementation, the deletion module is configured to: perform, in response to that a difference between a latest refresh time of the object prompt identifier and a current time exceeds the time length threshold, decreasing a transparency of the object prompt identifier using a preset gradient until the transparency of the object prompt identifier is zero.

According to another aspect, a computer device is provided, including a processor and a memory, the memory storing at least one computer program, the at least one computer program being loaded and executed by the processor to implement the object prompting method in a virtual scene.

According to another aspect, a computer-readable storage medium is provided, the memory storing at least one computer program, the at least one computer program being loaded and executed by a processor to implement the object prompting method in a virtual scene.

According to another aspect, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the object prompting method in a virtual scene provided in the foregoing various optional implementations.

The technical solutions provided in this application may include the following beneficial effects:

The object prompt identifier is displayed in the compass information in the virtual scene picture. The object prompt identifier is used for indicating the relationship between the first virtual object and the sound source object in the virtual scene. The compass information is generally displayed in a prominent location in the virtual scene picture. For example, the compass information is generally displayed at an upper-middle location of the virtual scene picture. When the user performs virtual object control based on the virtual scene picture, the compass information may be directly observed. Therefore, the object prompt identifier may be displayed in correspondence with the compass information, so that the user can view the compass information and observe the object prompt identifier at the same time, thereby improving the display effect of the object prompt identifier of the sound source object, improving the prompt effect of determining the location of the virtual object, improving determining efficiency of determining the location of the virtual object, and further improving interaction efficiency of the virtual scene interface.

It is to be understood that the foregoing general descriptions and the following detailed descriptions are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification.

FIG. 5 is a flowchart of an object prompting method in a virtual scene according to an embodiment of this application.

FIG. 6 is a schematic diagram of complete compass information according to an embodiment of this application.

DESCRIPTION OF EMBODIMENTS

Figure 1:
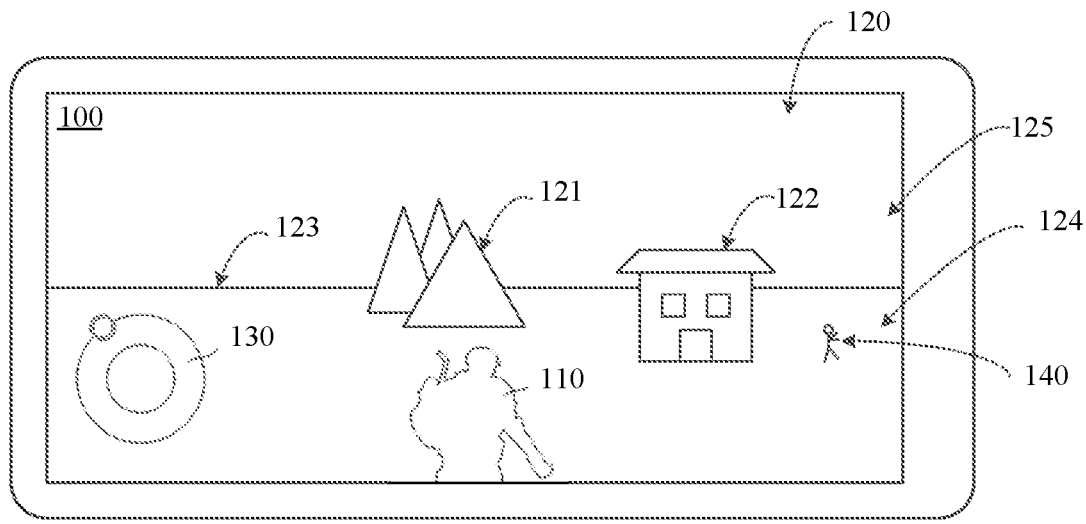
FIG. 1 is a schematic diagram of a scene picture of a virtual scene according to an embodiment of this application.

Exemplary embodiments are described in detail herein, and examples of the embodiments are shown in the accompanying drawings. Unless otherwise specified, the same reference numerals in different drawings represent the same or similar elements for drawings mentioned in the following description. The implementations described in the embodiments below are not intended to represent all implementations according to this application. Instead, they are merely examples of the apparatus and method according to some aspects of this application as recited in the appended claims.

"Several" mentioned in this specification means one or more, and "plurality of" means two or more. The "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

An embodiment of this application provides an object prompting method in a virtual scene, which may improve a display effect of an object prompt identifier of a sound source object in a virtual scene in which compass information exists. For ease of understanding, several terms involved in this application are explained below.

1) Virtual Scene

A virtual scene is a virtual scene displayed (or provided) by an application when run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene, and description is made by using an example in which the virtual scene is a three-dimensional virtual scene in the following embodiments, but this is not limited. In some embodiments, the virtual scene is further used for fighting in a virtual scene between at least two virtual roles. In some embodiments, the virtual scene is further used for fighting with virtual guns between at least two virtual roles. In some embodiments, the virtual scene is further used for fighting with virtual guns between at least two virtual roles within a target region range, and the target region range continuously decreases with time in the virtual scene.

The virtual scene is generally generated by an application program in a terminal such as a computer device and presented based on hardware (for example, a screen) in the terminal. The terminal may be a mobile terminal such as a smartphone, a tablet computer, or an e-book reader. Alternatively, the terminal may be a notebook computer or a personal computer device of a fixed computer.

2) Virtual Object

A virtual object is a movable object in a virtual scene. The movable object may be at least one of a virtual character, a virtual animal, and an animation character. In some embodiments, in accordance with a determination that the virtual scene is a three-dimensional virtual environment, the virtual object is a three-dimensional model created based on a skeletal animation technology. Each virtual object has a shape and a volume in the 3D virtual scene, and occupies some space in the 3D virtual scene.

The virtual scene may be a three-dimensional virtual scene, or the virtual scene may be a two-dimensional virtual scene. Using an example in which the virtual scene is a three-dimensional virtual scene, FIG. 1 is a schematic diagram of a scene picture of a virtual scene according to an embodiment of this application. As shown in FIG. 1, a scene picture 100 of a virtual scene includes a virtual object 110, an environment picture 120 of a three-dimensional virtual scene, at least one group of virtual control buttons 130, and a virtual object 140. The virtual object 110 may be a current control object of a user corresponding to the terminal, and the virtual control button 130 is an optional control element, that is, the user may control the virtual object 110 by using the virtual control button 130. The virtual object 140 may be a non-user-controlled object, that is, the virtual object 140 is controlled by the application program itself, or the virtual object 140 may be a virtual object controlled by a user corresponding to another terminal. The user may interact with the virtual object 140 by controlling the virtual object 110, for example, control the virtual object 110 to attack the virtual object 140.

In FIG. 1, the virtual object 110 and the virtual object 140 are three-dimensional models in the three-dimensional virtual scene. An environment picture of the three-dimensional virtual scene displayed in the scene picture 100 is an object observed from a perspective of the virtual object 110. As shown in FIG. 1, an environment picture 120 of the three-dimensional virtual scene displayed in a perspective of the virtual object 110 is ground 124, sky 125, horizon line 123, hill 121, and factory building 122.

The virtual object 110 may be moved instantly under control of the user. For example, the virtual control button 130 shown in FIG. 1 is a virtual button used for controlling movement of the virtual object 110. When the user touches the virtual control button 130, the virtual object 110 may move in the virtual scene toward a direction of a touch point relative to a center of the virtual control button 130.

Figure 2:
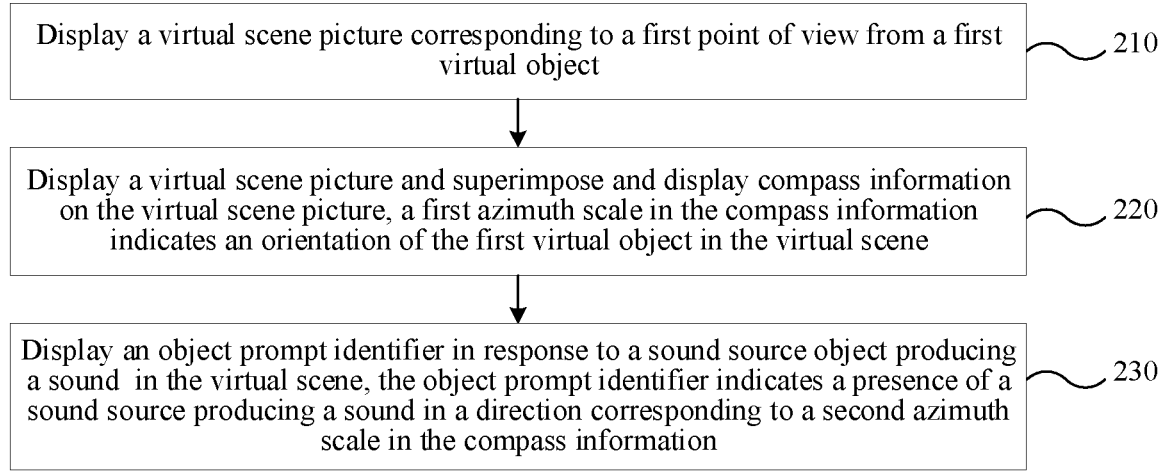
FIG. 2 is a flowchart of an object prompting method in a virtual scene according to an embodiment of this application.

FIG. 2 is a flowchart of an object prompting method in a virtual scene according to an embodiment of this application. An object prompting method in a virtual scene may be executed by a computer device. The computer device may be a terminal, or may be a terminal and a server. As shown in FIG. 2, the object prompting method in a virtual scene may include the following steps:

Step 210: Display a virtual scene picture corresponding to a first point of view from a first virtual object.

The virtual scene picture is a picture of the virtual scene from a perspective of a first virtual object. The first virtual object is a virtual object controlled by a current computer device to move in the virtual scene.

Step 220: Display a virtual scene picture and superimpose and display compass information on the virtual scene picture, a first azimuth scale in the compass information indicates an orientation of the first virtual object in the virtual scene.

The azimuth scale range that can be displayed in the compass information may be a visual field range of the first virtual object in the virtual scene, or is greater than a visual field range of the first virtual object in the virtual scene, or is less than a visual field range of the first virtual object in the virtual scene. The azimuth scale range in the compass information includes an orientation of the first virtual object in the virtual scene. For example, the visual field range of the first virtual object in the virtual scene is 45°, and a gap between a minimum azimuth scale and a maximum azimuth scale in the compass information is 45°, or greater than 45°, or less than 45°.

The orientation of the virtual object in the virtual scene may be a direction facing the virtual object. For example, when the virtual object in the virtual scene is in a posture such as standing, squatting, jumping, or floating, the orientation of the virtual object is a direct front facing the virtual object. Alternatively, the orientation of the virtual object may be a direction that points from a foot of the virtual object to a head of the virtual object. For example, the virtual scene is a three-dimensional virtual scene. The computer device may determine the orientation of the virtual object by using an acquired projection direction of the virtual object in the horizontal direction of the three-dimensional coordinate system. For example, when the virtual object is in a pose such as lying, swimming, or flying, the orientation of the virtual object is a direction that points from a foot of the virtual object to a head of the virtual object. Further, the orientation of the virtual object is a projection direction, in the horizontal direction in the three-dimensional coordinate system, of the direction in which the foot of the virtual object points to the head of the virtual object. When the virtual scene is a two-dimensional virtual scene, the orientation of the virtual object is a direction toward the face of the virtual object. In this embodiment of this application, the method provided in this application is described by using an example in which the virtual scene is a three-dimensional virtual scene.

In a possible implementation, the compass information is in an active region of a three-dimensional (3D) picture in a virtual scene picture, and is used for displaying the orientation of the virtual object in the virtual scene. The active region of the 3D picture may be a region in which a quantity of user interface (UI) controls superimposed and displayed on the virtual scene picture is less than a quantity threshold. The UI control is used for controlling the activity of the virtual object in the virtual scene based on a received user touch operation. The compass information is generally displayed at an upper location or a lower location of the active region of the 3D picture, or the azimuth indicator scale may also be displayed at another location of the active region of the 3D picture, such as a left edge. A display location of the azimuth indicator scale in the active region of the 3D picture may be set by a developer, or may be adjusted by a user. This is not limited in this embodiment of this application.

Figure 3:
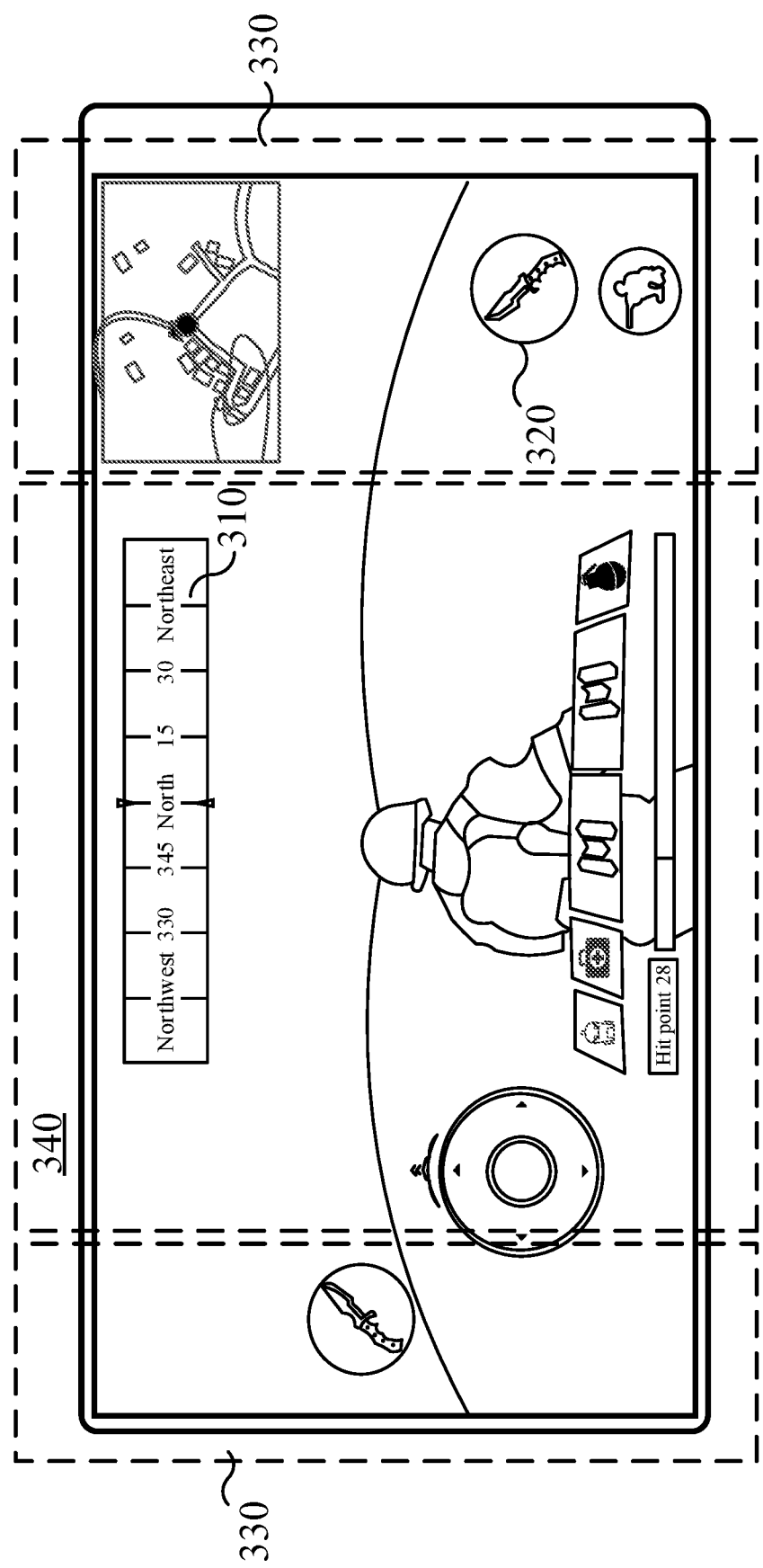
FIG. 3 is a schematic diagram of a virtual scene picture according to an embodiment of this application.

For example, the active region of the 3D picture is located in a central region of the virtual scene picture, and the compass information is located at a middle-upper location of the middle part of the virtual scene picture, or the compass information is located at a middle-lower location of the middle part of the virtual scene picture. An example in which the compass information is located at the upper location of the active region of the 3D picture is used. FIG. 3 is a schematic diagram of a virtual scene picture according to an embodiment of this application. As shown in FIG. 3, compass information 310 and a UI control 320 are superimposed and displayed on the virtual scene picture. To facilitate the user to perform an operation on the UI control, the developer generally sets the UI control in regions on two sides of the virtual scene picture, that is, a region 330 shown in FIG. 3, and the region may be referred to as a UI control region. When the user performs a touch operation, a line of sight of the user generally moves along the virtual object in the virtual scene, so as to control the virtual object by using the UI control according to the activity of the virtual object in the virtual scene, and setting of the UI control causes occlusion of the virtual scene picture on two sides of the user, which affects observation of the virtual scene picture by the user. Therefore, the line of sight of the user generally remains in a region that is centered on the virtual object and includes a relatively small quantity of UI controls, that is, a region 340 shown in FIG. 3, where the region may be referred to as a 3D active picture region, and a quantity threshold of UI controls or a range of the 3D picture active region may be set by the developer.

In some embodiments, when the compass information is superimposed and displayed, the compass information may be directly disposed at a center location above the virtual scene picture, so that the compass information always falls within a main field of view of the virtual object, and the user can observe the compass information.

The compass information is a control or a pattern that includes an azimuth scale. For example, when the virtual scene is a game scene, the compass information may be implemented as a virtual compass in the game scene or the azimuth indicator scale shown in FIG. 3. In this embodiment of this application, that the compass information is displayed in a form of an azimuth indicator scale is used as an example for description.

Step 230: Display an object prompt identifier in response to a sound source object producing a sound in the virtual scene, the object prompt identifier indicates that a sound source producing a sound exists in a direction corresponding to a second azimuth scale in the compass information.

In some embodiments, the sound source object may be at least one of the virtual object, a virtual prop, or a virtual carrier in the virtual scene. Different types of sound sources may correspond to different object prompt identifiers.

Figure 4:
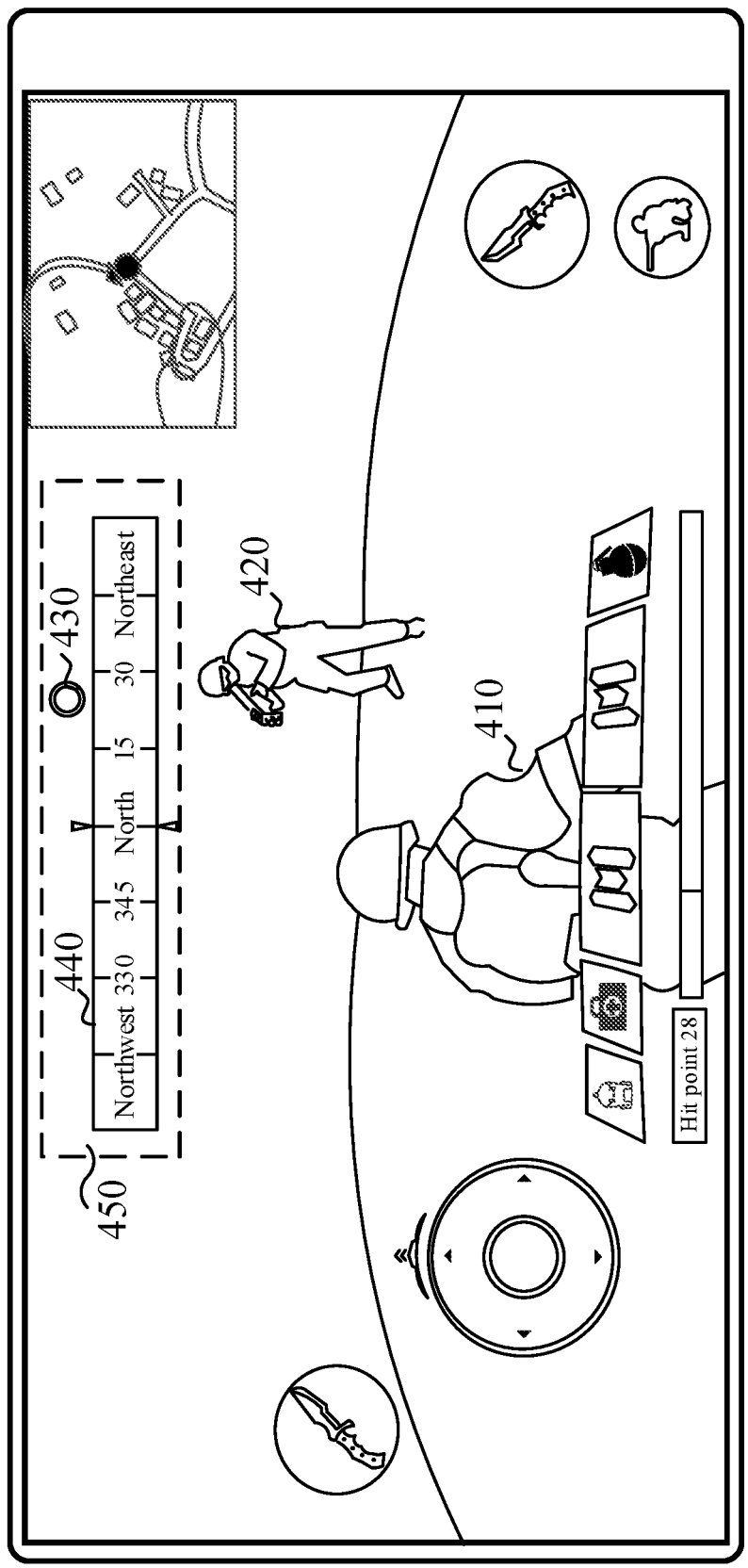
FIG. 4 is a schematic diagram of a virtual scene picture according to an embodiment of this application.

An example in which the sound source object is the virtual object in the virtual scene is used. FIG. 4 is a schematic diagram of a virtual scene picture according to an embodiment of this application. As shown in FIG. 4, the virtual scene picture is a picture observed from a virtual object 410. The virtual scene picture includes an object prompt identifier 430, where the object prompt identifier 430 is used for indicating that a sound source object 420 producing a sound exists in the virtual scene. The object prompt identifier 430 is displayed in an object prompt identifier display region 450, and the object prompt identifier display region is used for limiting a display range of the object prompt identifier.

The object prompt identifier display region may be set by the developer based on the compass information, or may be set by the user based on the compass information according to an actual requirement. For example, the object prompt identifier display region is a minimum adjacent rectangle of the compass information, or the object prompt identifier display region is determined based on the minimum adjacent rectangle of the compass information, for example, a region range corresponding to a rectangle of a specified length distant from the minimum adjacent rectangle is determined as the object prompt identifier display region.

Alternatively, in a possible implementation, the object prompt identifier may be displayed in a scale display region of the compass information, that is, a display region 440 shown in FIG. 4. The scale display region is used for indicating a region in which scale information is marked in the compass information. For example, the scale information may be represented as digital information or text information. This embodiment of this application is described by using an example in which the object prompt identifier is displayed in the object prompt identifier display region.

In conclusion, according to the object prompting method in a virtual scene provided in this embodiment of this application, the object prompt identifier is displayed in the compass information in the virtual scene picture, and the object prompt identifier is used for indicating the relationship between the first virtual object and the sound source object in the virtual scene. This overcomes a problem that display of the object prompt identifier is limited due to an area limitation of the display region, thereby improving a display effect of the object prompt identifier of the sound source object, improving a prompt effect of the location of the virtual object, improving determining efficiency of determining the location of the virtual object, and further improving interaction efficiency of the virtual scene interface.

FIG. 5 is a flowchart of an object prompting method in a virtual scene according to an embodiment of this application. An object prompting method in a virtual scene may be executed by a computer device. The computer device may be a terminal, or may be a terminal and a server. As shown in FIG. 5, the object prompting method in a virtual scene may include the following steps:

Step 510: Display a virtual scene picture corresponding to a first point of view from a first virtual object.

Step 520: Display a virtual scene picture and superimpose and display compass information on the virtual scene picture, a first azimuth scale in the compass information indicates an orientation of the first virtual object in the virtual scene.

In some embodiments, the first azimuth scale is an azimuth scale at a central location of the compass information, or the first azimuth scale is an azimuth scale marked by using a specific identifier, for example, an azimuth scale marked by using a pointer identifier. This embodiment of this application sets no limitation on a display location or an annotation manner of the first azimuth scale. The value of the first azimuth scale changes with the orientation of the first virtual object.

Figure 7:
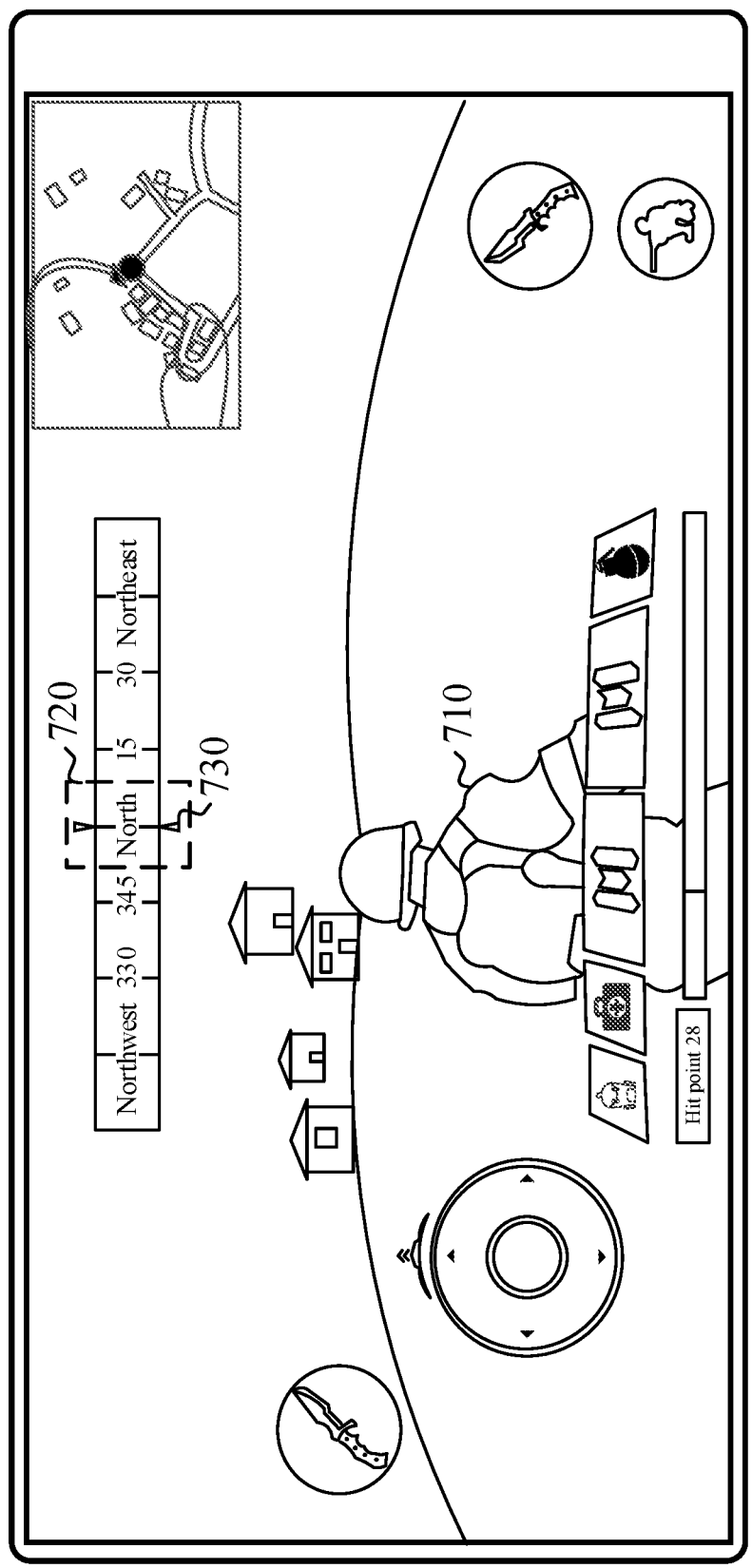
FIG. 7 is a schematic diagram of a virtual scene picture according to an embodiment of this application.
Figure 8:
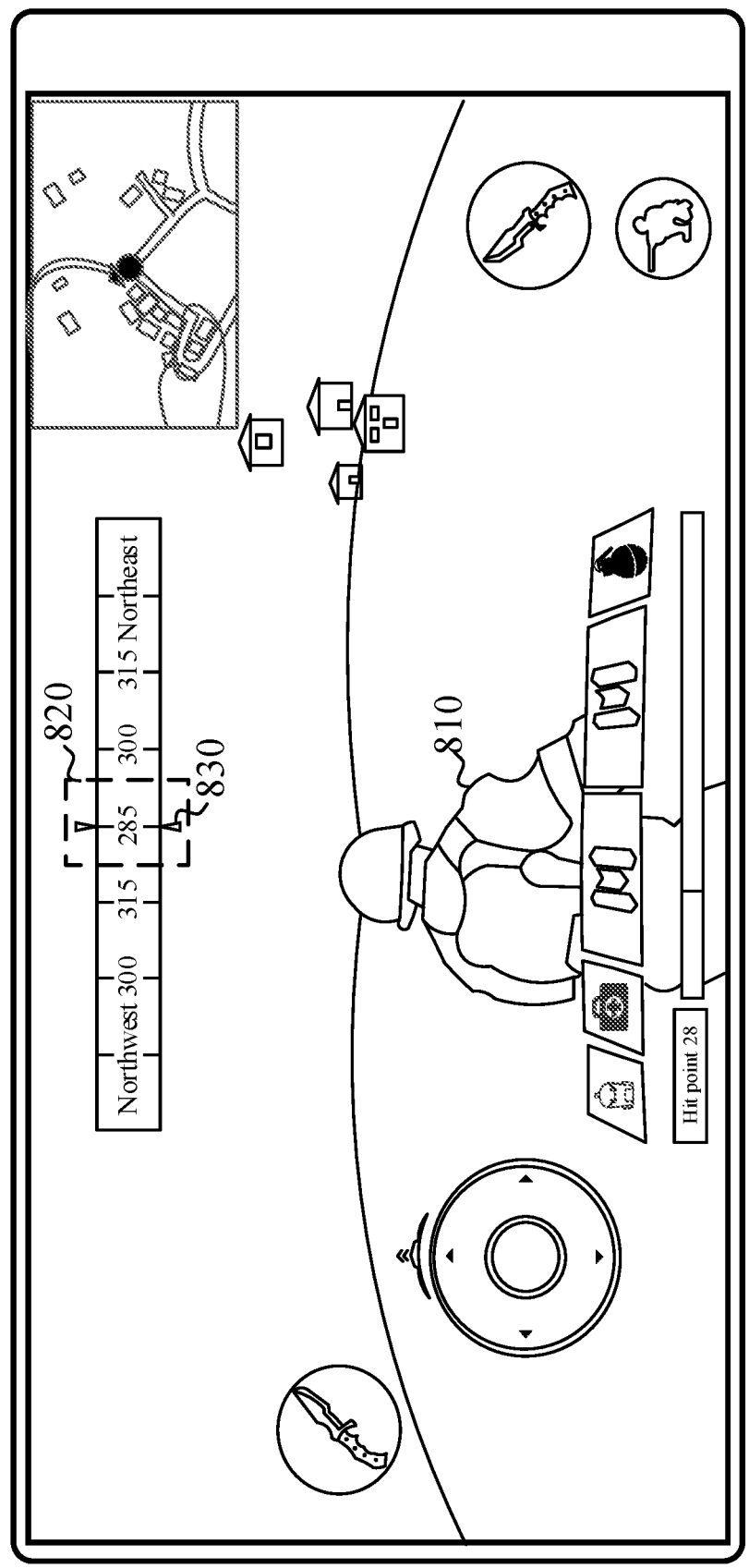
FIG. 8 is a schematic diagram of a virtual scene picture according to an embodiment of this application.

In a possible implementation, a compass information display region of a specified area is disposed in the virtual scene picture, and the compass information is displayed in the compass information display region. Because the region size of the compass information is limited, a part of azimuth information in the compass information may be displayed in the display region of the compass information. To ensure that the compass information can indicate the orientation of the first virtual object, the compass information may be displayed centered on the orientation of the first virtual object in the compass information display region. As the orientation of the first virtual object changes, the azimuth information in the compass information display region changes accordingly. At the same time, to highlight the orientation of the first virtual object, when the azimuth information corresponding to the orientation of the first virtual object is displayed, display may be performed in a manner different from that of other azimuth information, for example, a font type, font size, color change, show border setting, underline setting, or pointer identifier setting. Complete compass information identifies azimuth information from 0° to 360° at a preset angle interval, where 0° and 360° overlap. In some embodiments, 0° (360° in the azimuth indication mark is used for indicating a due north direction in a three-dimensional virtual scene. Therefore, a word "north" or a character "N" used for indicating the north may also be used for indicating 0° (360°). A preset angle interval in the compass information may be set by a related person according to an actual requirement, a display manner of a special azimuth identifier in the compass information, and a location of the compass information display region may also be preset by the related person. In this application, for example, 0° is used for indicating a due north direction in the three-dimensional virtual scene, and the preset angle interval is 15°. FIG. 6 is a schematic diagram of complete compass information according to an embodiment of this application. As shown in FIG. 6, azimuth information of 0° to 360° is displayed at an angle interval of 15° in compass information 610, that is, 0° (360°), 15°, 30°, . . . , 345°, 360° (0°), and 0° and 360° overlap. When a special azimuth, for example, 0° and 360°, is displayed, it may be displayed as a pattern shown in FIG. 6, that is, represented by 0° (360°) and 360° (0°), or may be represented by azimuth information in the three-dimensional virtual scene represented by the special azimuth, for example, a word "north" in the compass information shown in FIG. 4, that is, representing 0° and 360°. FIG. 7 is a schematic diagram of a virtual scene picture according to an embodiment of this application. As shown in FIG. 7, a part of azimuth information of the complete compass information shown in FIG. 6 is displayed in a compass information display region in a virtual scene picture, where an orientation 720 of a first virtual object 710 is displayed at the center. As shown in FIG. 7, a current orientation of the first virtual object is a due north direction, that is, 0° or 360°. To highlight the orientation, the orientation is indicated by using a set pointer identifier 730. In response to a change of the orientation of the first virtual object in the virtual scene, the azimuth information displayed in the compass information display region is also changed. FIG. 8 is a schematic diagram of a virtual scene picture according to an embodiment of this application. As shown in FIG. 8, an orientation of a first virtual object 810 in a virtual scene rotates leftwards from the due north direction shown in FIG. 7 to 285°, a direction 820 indicated by a pointer identifier 830 in the compass information, that is, a first azimuth scale is also changed from "north" to "285°", and the changed azimuth information is displayed at the center.

Step 530: Acquire a first location and a second location in response to the sound source object producing a sound in the virtual scene. The first location is a location of the first virtual object in the virtual scene, and the second location is a location of the sound source object in the virtual scene.

The sound source object may include at least one of the virtual object, a virtual prop, and a virtual carrier. For example, the virtual object may produce a sound by using a physical action of the virtual object, such as walking or swimming. Alternatively, the virtual object may produce a sound by using a virtual prop, for example, shoot by using the virtual prop, or explode by triggering a mine. Alternatively, the virtual object may produce a sound by using the virtual carrier, for example, produce a sound when the virtual object drives a virtual vehicle. A sound source object is not limited in this application.

When the location of the virtual object in the virtual scene is acquired, spatial coordinates of the first virtual object and the sound source object in the virtual scene may be separately acquired, first spatial coordinates of the first virtual object in the virtual scene are acquired as the first location, second spatial coordinates of the sound source object in the virtual scene are acquired as the second location, and an object prompt identifier indicating the sound source object is displayed in a range of the compass information based on a relationship between the first location and the second location.

The relationship between the first location and the second location means that the relationship between the first virtual object and the sound source object includes a distance relationship and an azimuthal relationship. In a possible implementation, the object prompt identifier is used for representing the distance relationship between the first virtual object and the sound source object by using the display attribute, and represent the azimuthal relationship between the first virtual object and the sound source object by using the display location corresponding to the compass information, that is, the display attribute of the object prompt identifier is determined based on the distance relationship between the first location and the second location; the second azimuth scale is determined based on the azimuthal relationship between the first location and the second location; and the object prompt identifier is displayed according to the display attribute and the second azimuth scale.

In a possible implementation, a process of acquiring the display attribute of the object prompt identifier may be implemented as follows:

acquiring a target distance between the first location and the second location; and determining, according to a mapping relationship between the target distance and the display attribute, the display attribute of the object prompt identifier in the compass information.

In a possible implementation, the display attribute includes at least one of a size of the object prompt identifier, a display transparency of the object prompt identifier, a color of the object prompt identifier, and a display shape of the object prompt identifier.

Figure 9:
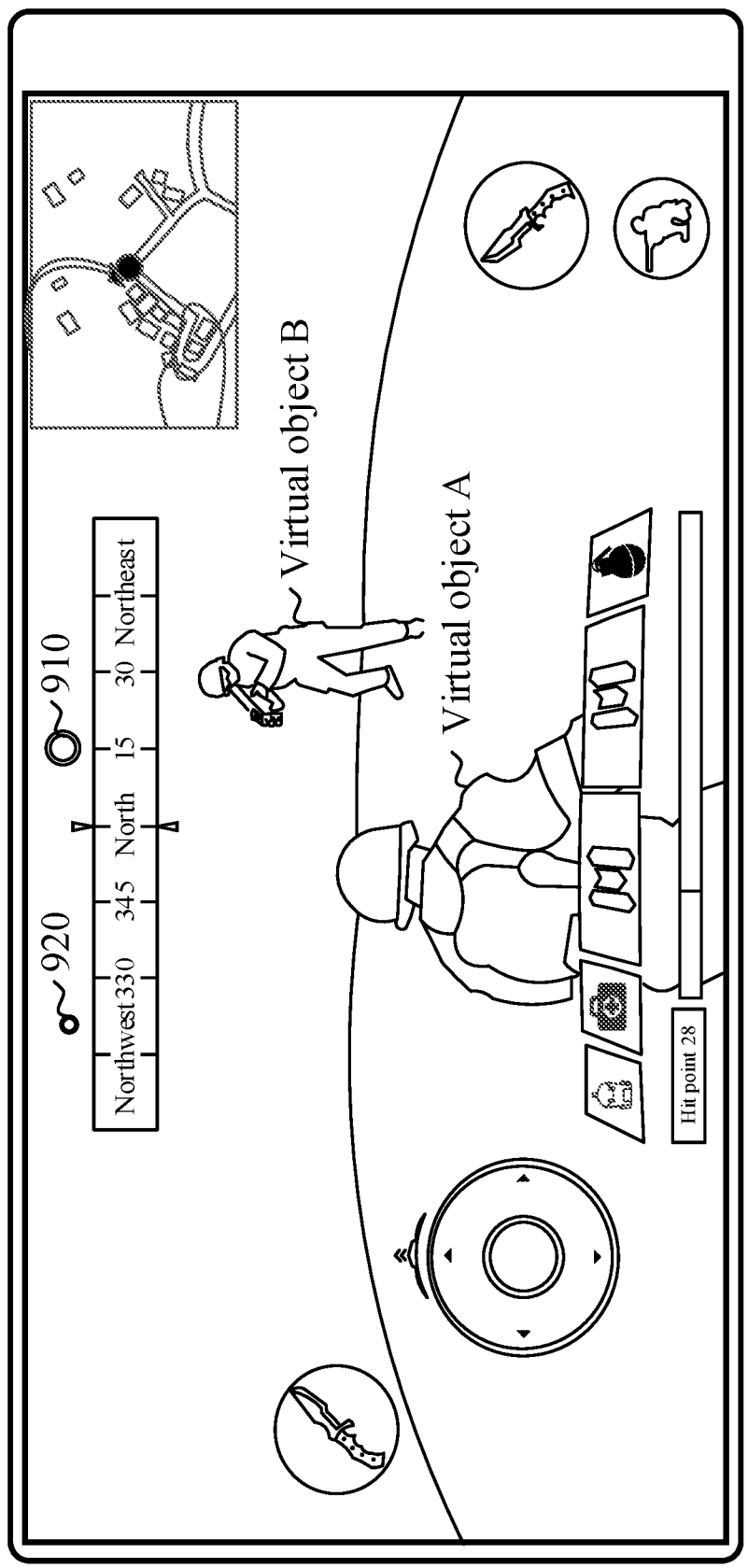
FIG. 9 is a schematic diagram of display attributes of object prompt identifiers corresponding to different target distances according to an embodiment of this application.

A mapping relationship between the target distance and the display attribute of the object prompt identifier is set in the computer device. For example, the display attribute of the object prompt identifier is used as the size of the object prompt identifier, and the target distance is inversely proportional to the size of the object prompt identifier. A smaller target distance indicates a larger object prompt identifier, a larger target distance indicates a smaller object prompt identifier, and a correspondence between the target distance and the size of the object prompt identifier may be determined by setting a corresponding function formula. This is not limited in this application. For example, the display attribute of the object prompt identifier is used as a color of the object prompt identifier. A target distance size may be inversely proportional to a color depth of the object prompt identifier. A smaller target distance indicates a darker color of the object prompt identifier, and a larger target distance indicates a lighter color of the object prompt identifier. Using an example in which the sound source object is a second virtual object in the virtual scene, the second virtual object is a virtual object except the first virtual object in the virtual scene, and a quantity of second virtual objects is at least one. The first virtual object is a virtual object controlled by a terminal that displays a current virtual scene picture. FIG. 9 is a schematic diagram of display attributes of object prompt identifiers corresponding to different target distances according to an embodiment of this application. As shown in FIG. 9, for example, the display attribute is used as the size of the object prompt identifier, a target distance between a virtual object B and a virtual object A is relatively small, an object prompt identifier 910 corresponding to the target distance is relatively large, and a target distance between a virtual object C (not shown in FIG. 9) and the virtual object A is relatively large, and an object prompt identifier 920 corresponding to the target distance is relatively small, where the virtual object A is the first virtual object, and the virtual object B and the virtual object C are second virtual objects.

In a possible implementation, at least two display attributes may be combined to represent the target distance. For example, by using a combination of the two display attributes to represent the target distance, a change of the object prompt identifier from a square to a circle is set, and a change of transparency from high to low to represent a change of the target distance from far to near. That is, a larger target distance indicates that a shape of the object prompt identifier is closer to a square, and the transparency is higher, and a smaller target distance indicates that the shape of the object prompt identifier is closer to a circle, and the transparency is lower.

A process of determining the second azimuth scale based on the azimuthal relationship between the first location and the second location may be implemented as follows:

acquiring an azimuth angle of the second location relative to the first location; and determining the second azimuth scale based on the azimuth angle. The second azimuth scale is used for indicating the display location of the object prompt identifier in the compass information.

Figure 10:
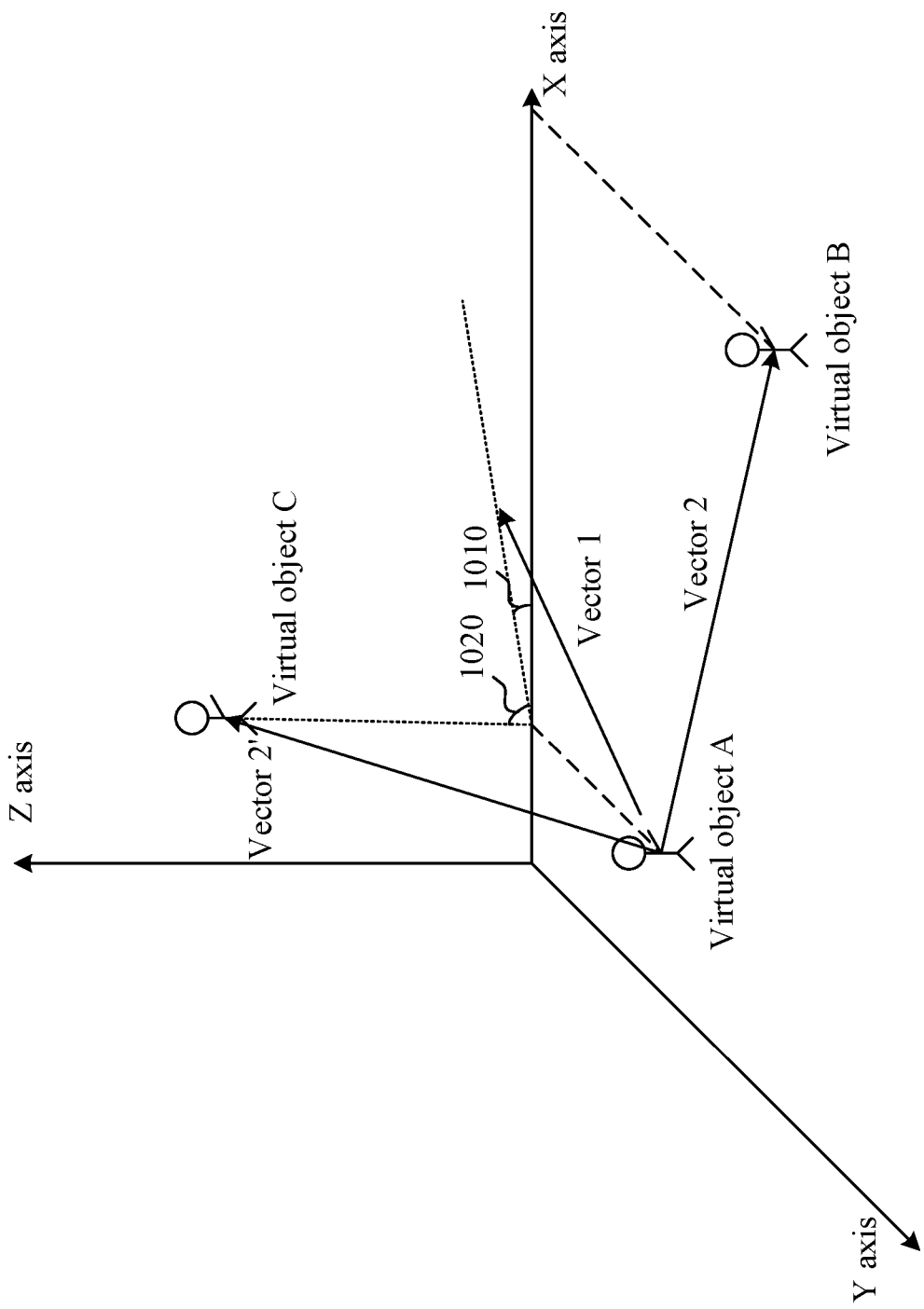
FIG. 10 is a schematic diagram of determining an azimuth angle according to an embodiment of this application.

In a possible implementation, the azimuth angle of the second location relative to the first location is determined based on projections of a first vector and a second vector in a plane including an x-axis and a z-axis in a three-dimensional rectangular coordinate system of the virtual scene, where the first vector is a vector corresponding to a line that points to the second location, and the second vector is a vector in a direction that faces the first virtual object. FIG. 10 is a schematic diagram of determining an azimuth angle according to an embodiment of this application. As shown in FIG. 10, for example, a sound source object is a virtual object other than a first virtual object. In a three-dimensional rectangular coordinate system of a virtual scene, a virtual object A (the first virtual object) and a virtual object B are located on the same horizontal plane (an xy plane), when an azimuth angle between the first location and the second location is determined, the first location (a location at which the virtual object A is located) is connected to the second location (a location at which the virtual object B is located), and a line between the first location and the second location is acquired as a vector 2, an orientation of the virtual object A is acquired as a vector 1, and an angle 1010 between the vector 1 and a vector 2 is acquired on a plane xz, and a value of the angle 1010 is acquired as a value of an azimuth angle of the virtual object B relative to the virtual object A. The virtual object A and a virtual object C are located at different horizontal planes. As shown in FIG. 10, the virtual object C is located at a high location. When the azimuth angle between the first location and the second location is determined, the first location (the location at which the virtual object A is located) and the second location (the location in which the virtual object C is located) are connected, and a line between the first location and the second location is acquired as a vector 2', and an orientation of the virtual object A is acquired as a vector 1, an angle 1020 between the vector 1 and the vector 2' is acquired on the xz plane, and a value of the angle 1020 is acquired as a value of an azimuth angle of the virtual object C relative to the virtual object A.

The foregoing manner of calculating the azimuth angle of the sound source object relative to the first virtual object by projecting on the xz plane is merely an example used for illustration purposes. Alternatively, the azimuth angle of the sound source object relative to the first virtual object may be calculated by acquiring projections of the vector 1 and the vector 2 on another plane. This is not limited in this application.

In a possible implementation, in response to that the azimuth angle of the second location relative to the first location exceeds a display angle threshold of the compass information, object prompt identifier indication information is displayed corresponding to the compass information according to the display attribute and the second azimuth scale; the object prompt identifier indication information indicates that the object prompt identifier exists outside the display angle threshold of the compass information; and the display angle threshold indicates a maximum angle range that can be displayed by the compass information that centers on the orientation of the first virtual object.

Figure 11:
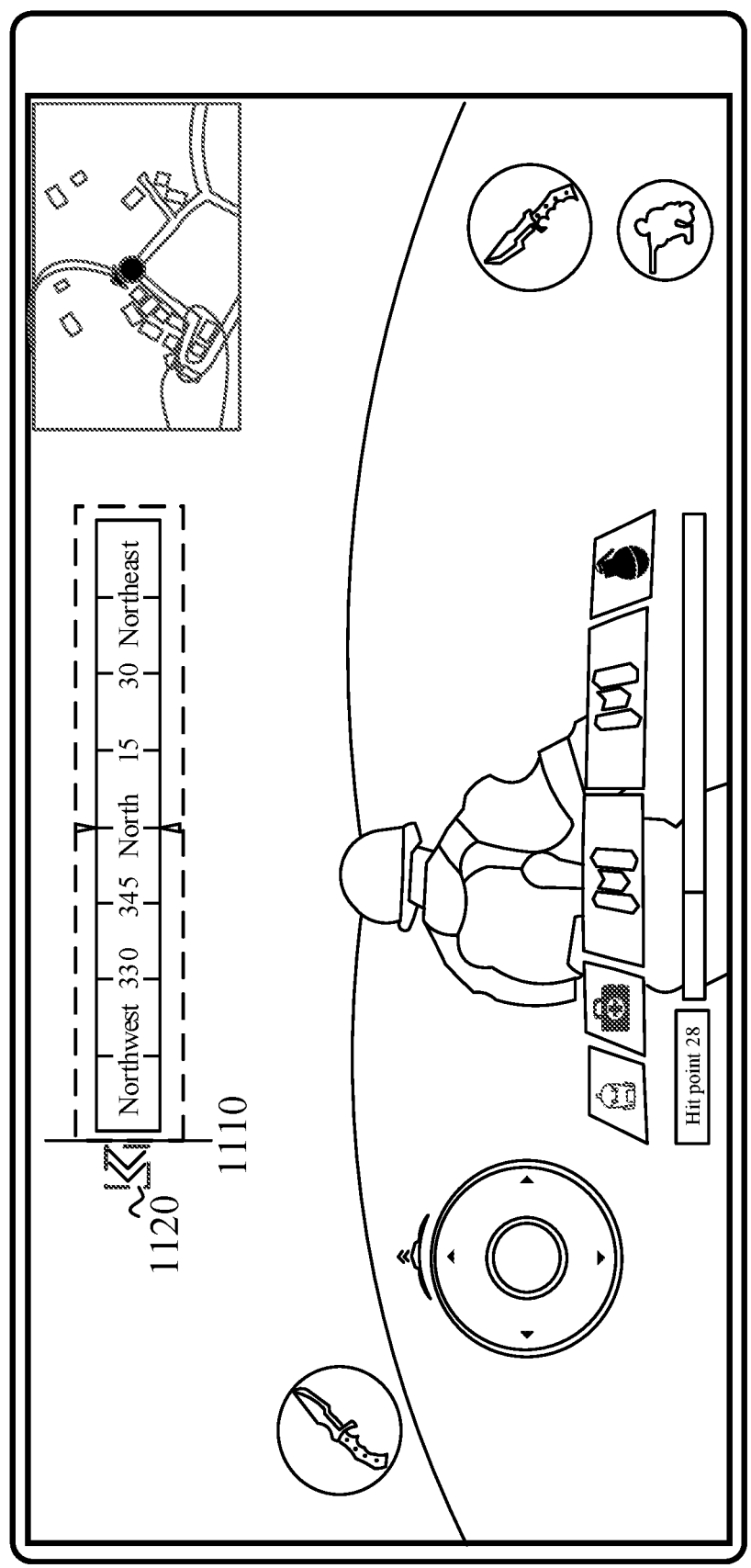
FIG. 11 is a schematic diagram of object prompt identifier indication information according to an embodiment of this application.
Figure 12:
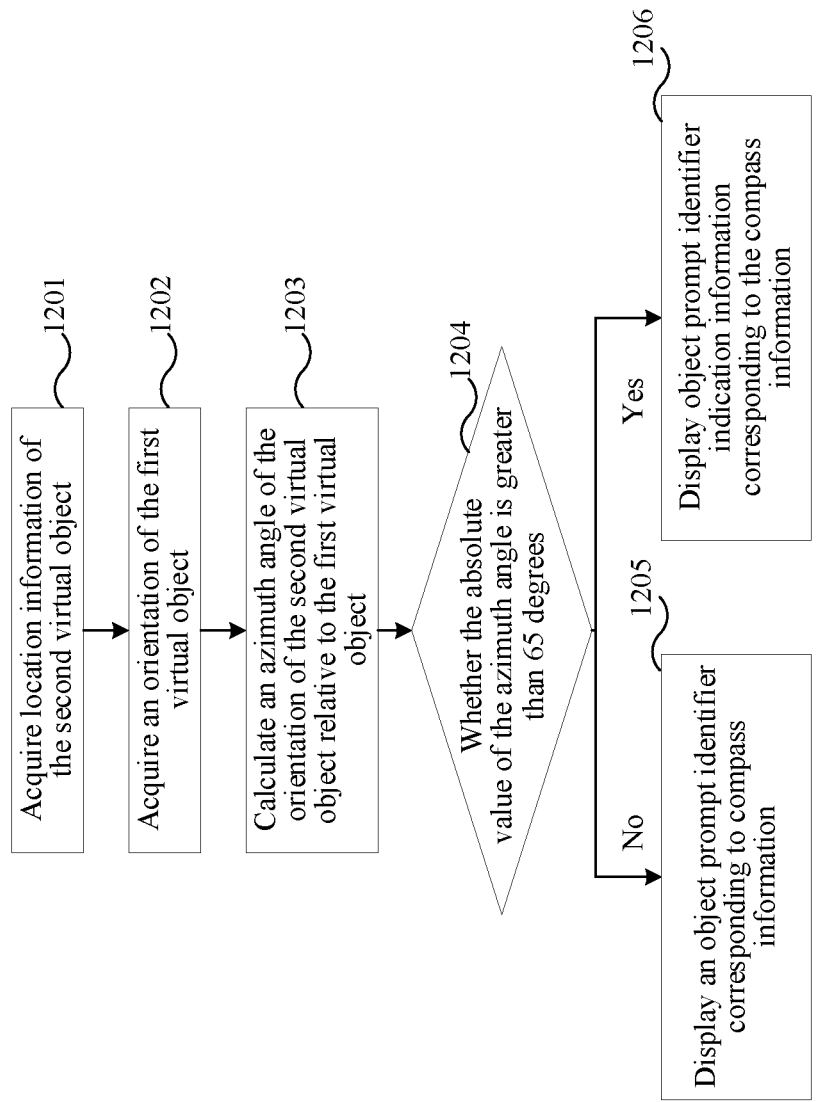
FIG. 12 is a flowchart of displaying object prompt identifier indication information according to an embodiment of this application.

That is, although the sound source produces a sound, because the azimuth angle of the second location relative to the first location exceeds the display angle threshold of the compass information, that is, exceeds the left or right boundary of the compass information display region, the object prompt identifier cannot be displayed in the current compass information. To indicate the location of the sound source object relative to the first virtual object, the object prompt identifier indication information may be displayed at a boundary that is in the compass information display region and corresponding to the azimuth angle. FIG. 11 is a schematic diagram of object prompt identifier indication information according to an embodiment of this application. As shown in FIG. 11, if the azimuth angle exceeds the left boundary of the compass information display region, and the display location of the object prompt identifier corresponding to the second location exceeds a left boundary 1110 of the compass information display region, object prompt identifier indication information 1120 is displayed at the left boundary 1110, so as to indicate that an object prompt identifier exists in this direction of the compass information. When the user adjusts the orientation of the first virtual object according to the object prompt identifier indication information, the compass information in the compass information display region rotates accordingly. When the azimuth angle of the second location relative to the first location falls within the display angle threshold of the compass information, the object prompt identifier is displayed corresponding to the compass information according to the display attribute and the second azimuth scale, that is, the object prompt identifier is displayed in the object prompt identifier display region, or the object prompt identifier is displayed in the scale display region of the compass information. For example, when the display angle threshold of the compass information is 135 degrees, and an angle between the sound source object and the first virtual object is greater than 65 degrees, or is less than −65 degrees, the object prompt identifier indication information needs to be displayed in the compass information. For example, the sound source object is a second virtual object. FIG. 12 is a flowchart of displaying object prompt identifier indication information according to an embodiment of this application. As shown in FIG. 12, the procedure includes the following steps.

S1201. Acquire location information of the second virtual object.

S1202. Acquire an orientation of the first virtual object.

S1203. Calculate an azimuth angle of the second virtual object relative to the first virtual object.

The azimuth angle of the second virtual object relative to the first virtual object is calculated based on the location information of the second virtual object and the orientation of the first virtual object.

S1204. Determine whether an absolute value of the azimuth angle is greater than 65 degrees, and if yes, perform S1206; otherwise, perform S1205.

S1205. Display an object prompt identifier corresponding to compass information.

S1206. Display object prompt identifier indication information corresponding to the compass information.

In a possible implementation, when the object prompt identifier corresponding to the object prompt identifier indication information disappears, the object prompt identifier indication information is deleted from a corresponding location of the compass information. For example, when the second virtual object corresponding to the object prompt identifier is eliminated, or a distance between the second virtual object corresponding to the object prompt identifier and the first virtual object exceeds a distance threshold, display of the object prompt identifier is canceled. Correspondingly, display of the object prompt identifier indication information is canceled.

Step 540: Display the object prompt identifier based on a relationship between the first location and the second location.

In a possible implementation, when the sound source object and the first virtual object are in different camps, the object prompt identifier is displayed corresponding to the compass information according to the display attribute and the display location;

a camp to which each of the first virtual object and the second virtual object belongs is acquired; and in response to that the first virtual object and the sound source object are located in different camps, the object prompt identifier is displayed corresponding to the compass information based on the relationship between the first location and the second location.

That is, when the object prompt identifier is displayed, only the object prompt identifier of the sound source object that is in a different camp from the first virtual object and that produces a sound may be displayed, so as to perform a hazard warning on the first virtual object, so as to instruct the first virtual object to move in a safe direction.

In a possible implementation, in response to that the first virtual object and the sound source object are in the same camp, the first object prompt identifier is displayed corresponding to the compass information according to the determined display attribute and display location, where the first object prompt identifier is an object prompt identifier different from the second object prompt identifier, and the second object prompt identifier is an object prompt identifier displayed in the compass information according to the determined display attribute and display location, in accordance to a determination that the sound source object and the first virtual object are in different camps.

Figure 13:
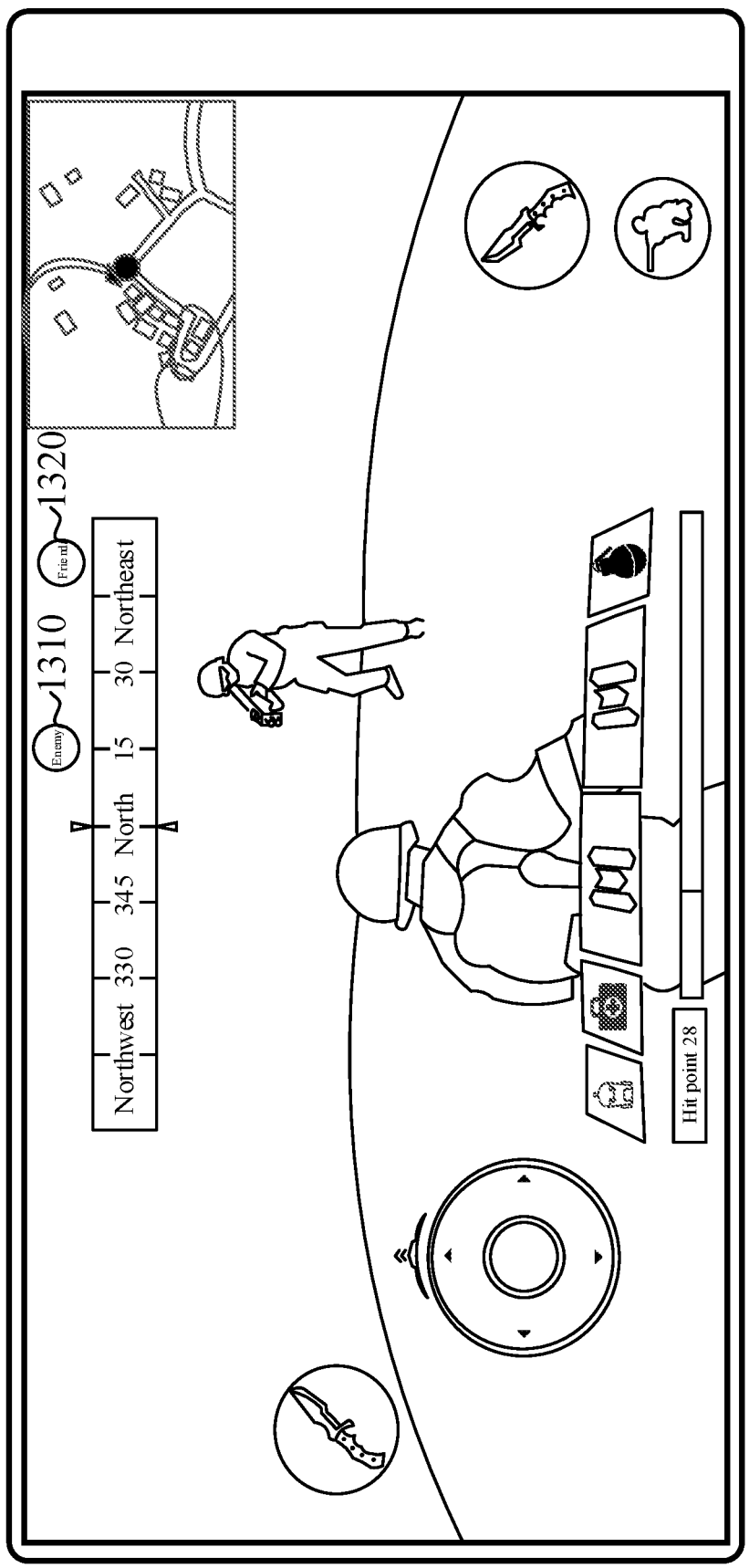
FIG. 13 is a schematic diagram of displaying object prompt identifiers of second virtual objects in different camps simultaneously in compass information according to an embodiment of this application.

That is, different object prompt identifiers may be used in the compass information to distinguish between a sound source object that produces a sound in the same camp as the first virtual object and a sound source object that produces a sound in a different camp from the first virtual object. FIG. 13 is a schematic diagram of displaying object prompt identifiers of sound source objects in different camps simultaneously in compass information according to an embodiment of this application. As shown in FIG. 13, an object prompt identifier 1310 and an object prompt identifier 1320 are displayed in the compass information, where the object prompt identifier 1310 is displayed as an "enemy", and is used for indicating that the object prompt identifier indicates the location, in the virtual scene, of the sound source object that is in a different camp from the first virtual object and produces a sound. The object prompt identifier 1320 is displayed as a "friend", and is used for indicating that the object prompt identifier indicates the location, in the virtual scene, of the sound source object that is in the same camp as the first virtual object and produces a sound. In a possible implementation, another object prompt identifier that has an opposite attribute or a different attribute may also be used for indicating a sound source object in a different camp. For example, a red object prompt identifier is used for indicating a sound source object that is in the same camp as the first virtual object and produces a sound, and a blue object prompt identifier is used for indicating a sound source object that is in a different camp from the first virtual object and produces a sound.

In the virtual scene, in addition to the sound source object that can produce a sound, another sound source object such as a virtual prop or a virtual carrier may also produce a sound, and sounds from different sound source objects have different sound types. Therefore, in a possible implementation, a sound source object producing a sound or a sound type of a produced sound may be prompted by using a displayed object prompt identifier. Therefore, displaying the object prompt identifier based on the relationship between the first location and the second location may be implemented as follows:

acquiring a sound type of the sound produced by the sound source object, the sound type indicates a production manner of the sound signal; and displaying the object prompt identifier according to the sound type and based on the relationship between the first location and the second location;

different sound types being corresponding to different types of object prompt identifiers.

For example, if the sound source object is a second virtual object, that is, a sound produced by the virtual object by using a physical action of the virtual object, the object prompt identifier is displayed as a first-type identifier, and the first object prompt identifier is used for indicating that the second virtual object is in a moving state. For example, when the second virtual object produces a sound by walking or swimming, the object prompt identifier is displayed as a first-type object prompt identifier. The first-type object prompt identifier may further include at least two first-type sub-identifiers that are respectively corresponding to different actions of the second virtual object. For example, when the second virtual object produces a sound by walking, the corresponding object prompt identifier is a "walking" object prompt identifier (that is, the first sub-identifier). When the second virtual object produces a sound by swimming, the corresponding object prompt identifier is a "swimming" object prompt identifier (that is, the second sub-identifier). Both the first sub-identifier and the second sub-identifier belong to the first-type sub-identifier.

If the sound source object is a virtual prop, the object prompt identifier is displayed as a second-type identifier, and the second-type identifier is used for indicating that the virtual prop is in a used state or a triggered state. For example, when there is gun shooting, or mine explosion is triggered, the object prompt identifier is displayed as a second-type identifier. The second-type object prompt identifier may further include at least two second-type sub-identifiers that are respectively corresponding to different virtual props. For example, when there is a sound produced by gun shooting, the corresponding object prompt identifier is a "bullet" or "gun" object prompt identifier (a third sub-identifier). When there is a sound produced by triggering a mine, the corresponding object prompt identifier is a "mine" object prompt identifier (a fourth sub-identifier). Both the third sub-identifier and the fourth sub-identifier belong to the second-type sub-identifier.

If the sound source object is a virtual carrier, the object prompt identifier is displayed as a third-type identifier, and the third-type identifier is used for indicating that the virtual carrier is in a used state. For example, when a virtual vehicle moves or explodes, the object prompt identifier is displayed as a third-type identifier. The third-type object may further include at least two third-type sub-identifiers that are respectively corresponding to different virtual carriers. For example, when there is a sound produced by driving a motorcycle, the corresponding object prompt identifier is a "motorcycle" object prompt identifier (a fifth sub-identifier). When there is a sound produced by driving a truck, the corresponding object prompt identifier is a "truck" object prompt identifier (a sixth sub-identifier). Both the fifth sub-identifier and the sixth sub-identifier belong to the third-type sub-identifier.

In a possible implementation, the foregoing manners of determining the object prompt identifier based on the camp of the virtual object and determining the object prompt identifier based on different sound source objects may be combined. For example, the second virtual object is located in a different camp from the first virtual object, the second virtual object produces a sound in a shooting manner, and the corresponding object prompt identifier may be displayed as a blue "bullet" object prompt identifier.

The virtual object moves in the virtual scene, and/or a virtual prop is used, and/or a virtual carrier moves intermittently or continuously. Therefore, frequency at which a sound is produced by the sound source object may be intermittent or continuous. For example, the intermittent produced sound may be that the user stops shooting after performing one shot, and the next shot is performed after a period of silence. The continuous produced sound may be continuous shooting by the user. Therefore, when the object prompt identifier is displayed, the object prompt identifier is refreshed and displayed based on a time interval at which the sound source object produces sounds and the relationship between the first location and the second location. For example, after the second virtual object performs shooting for the first time, corresponding compass information displays an object prompt identifier corresponding to the second virtual object. When the virtual object is in a silent state, the object prompt identifier remains displayed for a period of time. When the second virtual object performs shooting next time, the object prompt identifier is refreshed. Alternatively, when the second virtual object is in the continuous shooting state, the object prompt identifier is continuously refreshed, that is, the object prompt identifier is presented as a high-frequency flashing effect, so as to prompt the active state of the sound source object.

In a possible implementation, displaying the foregoing object prompt identifier is implemented by using a fade-in animation effect. That is, the object prompt identifier is gradually displayed at a corresponding location. For example, when the object prompt identifier is displayed, the object prompt identifier is first displayed as an object prompt identifier that is less obvious, and is gradually obviously displayed. A process of refreshing the object prompt identifier is: canceling/hiding an animation effect of the object prompt identifier last displayed, and displaying the object prompt identifier recently generated by using the fade-in animation effect corresponding to the compass information. Alternatively, the animation effect of the object prompt identifier displayed last time is interrupted, and a fade-in animation effect of the object prompt identifier generated recently is re-started to be displayed.

Figure 14:
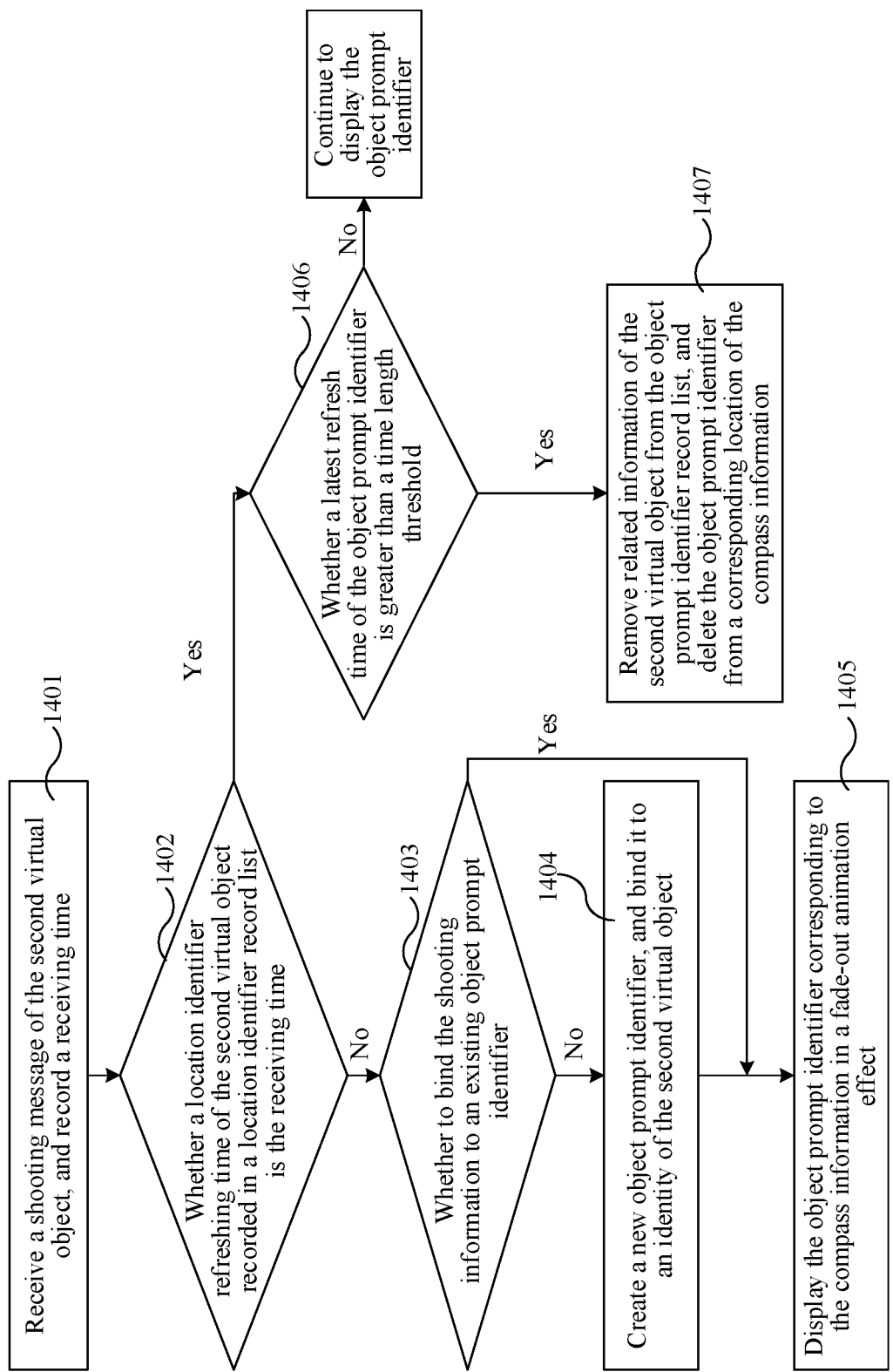
FIG. 14 is a flowchart of refreshing an object prompt identifier according to an embodiment of this application.

In a possible implementation, a fade-out animation effect of the object prompt identifier has an animation duration threshold. That is, the object prompt identifier needs to be displayed within the animation duration threshold. If the sound source object produces a sound continuously, that is, the object prompt identifier generated when the sound is produced last time is not fully displayed, the object prompt identifier generated when the sound is produced next time is started to be displayed. In this case, the object prompt identifier is refreshed in an animation interrupt manner, that is, the animation effect of the object prompt identifier that is not fully displayed is interrupted, and display of the animation effect of the next object prompt identifier is started again. For example, the sound source object is a second virtual object, and the second virtual object produces a sound by shooting. FIG. 14 is a flowchart of refreshing an object prompt identifier according to an embodiment of this application. As shown in FIG. 14, the refreshing procedure of the object prompt identifier includes the following steps.

S1401. Receive a shooting message of the second virtual object, and record a receiving time.

S1402. Determine whether an object prompt identifier refreshing time of the second virtual object recorded in an object prompt identifier record list is the receiving time, and if not, perform S1403; otherwise, perform S1406.

S1403. Determine whether to bind the shooting information to an existing object prompt identifier, and if yes, perform S1404; otherwise, perform S1405.

Binding the shooting information to the existing object prompt identifier means that when a virtual object corresponding to the shooting information is a virtual object with a history shooting operation and an object prompt identifier thereof is displayed based on the history shooting operation, when shooting is performed on the virtual object again, the shooting information may be bound and displayed to the existing object prompt identifier based on the virtual object corresponding to shooting information, without a need to recreate a new object prompt identifier.

S1404. Create a new object prompt identifier, and bind it to an identity of the second virtual object.

S1405. Display the object prompt identifier corresponding to the compass information in a fade-out animation effect.

S1406. Determine whether the latest refresh time of the object prompt identifier is greater than a time length threshold; if yes, perform S1407; otherwise, continue to display the object prompt identifier.

S1407. Remove related information of the second virtual object from the object prompt identifier record list, and delete the object prompt identifier from a corresponding location of the compass information.

If an object prompt identifier of a sound source object is not refreshed for a long time, it indicates that the location information of the sound source object is invalid, the object prompt identifier corresponding to the sound source object may be deleted. For example, if the object prompt identifier of the second virtual object is not refreshed for a long time, it indicates that the location of the second virtual object may have changed, or the second virtual object is eliminated, and it is meaningless to continue to display the object prompt identifier at the original location. Therefore, in a possible implementation, the object prompt identifier is deleted in response to that the time length in which the object prompt identifier is not refreshed exceeds the time length threshold.

A refresh time at which each object prompt identifier is recently refreshed is recorded, a time length between the refresh time and a current time is calculated, and it is determined, based on a relationship between the time length and a preset time length threshold, whether the object prompt identifier is not refreshed for a long time. In response to that a difference between the latest refresh time of the object prompt identifier and the current time exceeds the time length threshold, a preset gradient is used for decreasing transparency of the object prompt identifier until the transparency of the object prompt identifier is zero.

In a possible implementation, the transparency of the object prompt identifier may be adjusted to a preset gradient by setting a transparency decrement algorithm. That is, the object prompt identifier is deleted by using a fade-out animation effect. That is, after the object prompt identifier is displayed at a corresponding location for a period of time, if the object prompt identifier is not refreshed, display of the object prompt identifier is gradually faded out until the object prompt identifier is deleted.

Figure 15:
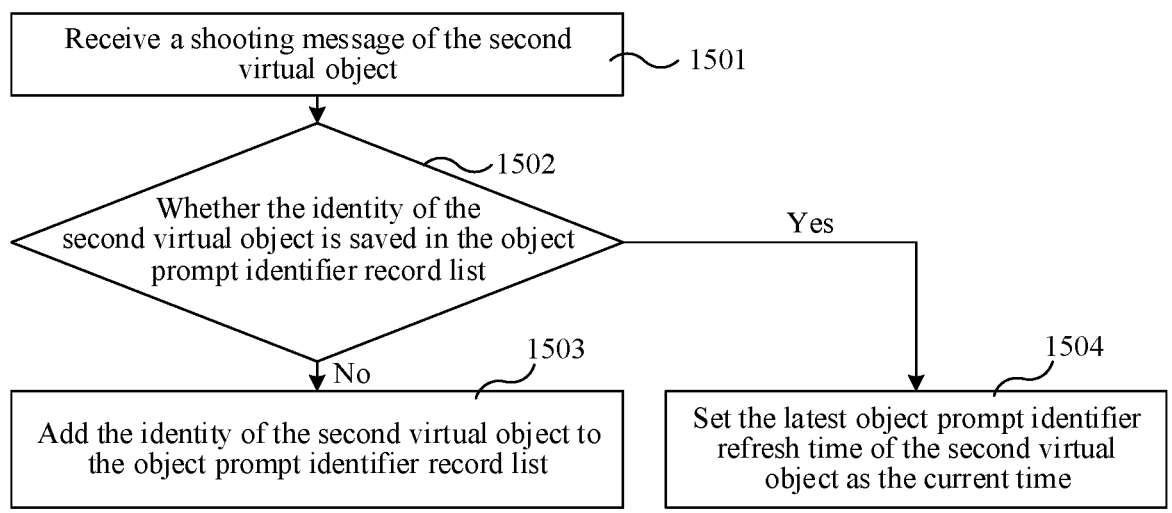
FIG. 15 is a flowchart of recording a location refresh time according to an embodiment of this application.

To reduce occupation of storage space of a computer device by the object prompt identifier refresh time, when the object prompt identifier refresh time is recorded, only a latest refresh time of each object prompt identifier is recorded. After the object prompt identifier is refreshed, a refresh time of an original record is replaced with the latest refresh time. For example, the sound source object is a second virtual object, and the second virtual object produces a sound by shooting. FIG. 15 is a flowchart of recording a location refresh time according to an embodiment of this application. As shown in FIG. 15, the record procedure includes the following steps.

S1501. Receive a shooting message of the second virtual object.

S1502. Determine whether the identity of the second virtual object is saved in the object prompt identifier record list; if not, perform S1503; otherwise, perform S1504.

S1503. Add the identity of the second virtual object to the object prompt identifier record list.

S1504. Set the latest object prompt identifier refresh time of the second virtual object as the current time.

Each identity corresponds to one second virtual object. When the object prompt identifier is displayed, the computer device traverses all object prompt identifier refresh times in the object prompt identifier record list to acquire an object prompt identifier that needs to be displayed on the compass information.

In conclusion, according to the object prompting method in a virtual scene provided in this embodiment of this application, the object prompt identifier is displayed in the compass information in the virtual scene picture, and the object prompt identifier is used for indicating the relationship between the first virtual object and the second virtual object in the virtual scene. This overcomes a problem that display of the object prompt identifier is limited due to an area limitation of the display region, thereby improving a display effect of the object prompt identifier of the sound source object, improving a prompt effect of the location of the virtual object, improving determining efficiency of determining the location of the virtual object, and further improving interaction efficiency of the virtual scene interface.

Figure 16:
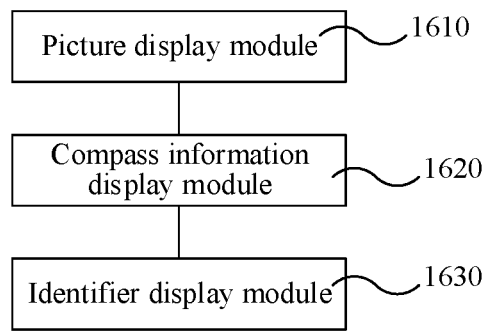
FIG. 16 is a block diagram of an object prompting apparatus in a virtual scene according to an embodiment of this application.

FIG. 16 is a block diagram of an object prompting apparatus in a virtual scene according to an embodiment of this application. As shown in FIG. 16, the object prompting apparatus in a virtual scene includes:
- a picture display module 1610, configured to display a virtual scene picture corresponding to a first point of view from a first virtual object;
- a compass information display module 1620, configured to superimpose and display compass information on the virtual scene picture, a first azimuth scale in the compass information indicates an orientation of the first virtual object in the virtual scene; and
- an identifier display module 1630, configured to display an object prompt identifier in response to a sound source object producing a sound in the virtual scene, the object prompt identifier indicates that a sound source producing a sound exists in a direction corresponding to a second azimuth scale in the compass information.

In a possible implementation, the identifier display module 1630 includes:
- a location acquiring submodule, configured to: acquire a first location and a second location in response to the sound source object producing a sound in the virtual scene, the first location being a location of the first virtual object in the virtual scene, and the second location being a location of the sound source object in the virtual scene; and
- a first identifier display submodule, configured to display the object prompt identifier based on a relationship between the first location and the second location.

In a possible implementation, the relationship between the first location and the second location includes a distance relationship and an azimuthal relationship; and
the first identifier display submodule includes:
- a display attribute determining unit, configured to determine a display attribute of the object prompt identifier based on the distance relationship between the first location and the second location;
- a scale determining unit, configured to determine the second azimuth scale based on the azimuthal relationship between the first location and the second location; and
- a first identifier display unit, configured to display the object prompt identifier according to the display attribute and the second azimuth scale.

In a possible implementation, the display attribute determining unit includes:
- a target distance acquiring subunit, configured to acquire a target distance between the first location and the second location; and
- a display attribute determining subunit, configured to determine, according to a mapping relationship between the target distance and the display attribute, the display attribute of the object prompt identifier in the compass information.

In a possible implementation, the display attribute includes at least one of a size of the object prompt identifier, a display transparency of the object prompt identifier, a color of the object prompt identifier, and a display shape of the object prompt identifier.

In a possible implementation, the scale determining unit includes:
- an azimuth angle acquiring subunit, configured to acquire an azimuth angle of the second location relative to the first location; and
- a scale determining subunit, configured to determine the second azimuth scale based on the azimuth angle.

In a possible implementation, the first identifier display unit is configured to: display object prompt identifier indication information according to the display attribute and the second azimuth scale in response to that the azimuth angle exceeds a display angle threshold of the compass information; the object prompt identifier indication information indicates that the object prompt identifier exists outside the display angle threshold of the compass information; and the display angle threshold indicates a maximum angle range that can be displayed by the compass information that centers on the orientation of the first virtual object.

In a possible implementation, in response to the sound source object being a second virtual object, the identifier display module 1630 includes:
- a camp acquiring submodule, configured to acquire, in response to the second virtual object in the virtual scene producing a sound, a camp to which each of the first virtual object and the second virtual object belongs; and
- a second identifier display submodule, configured to display the object prompt identifier in response to that the first virtual object and the second virtual object are in different camps.

In a possible implementation, the first identifier display submodule includes:
- a sound type acquiring unit, configured to acquire a sound type of a sound signal produced by the second virtual object; the sound type indicates a production manner of the sound signal; and
- a second identifier display unit, configured to display the object prompt identifier according to the sound type and based on the relationship between the first location and the second location;
- different sound types being corresponding to different types of object prompt identifiers.

In a possible implementation, the first identifier display submodule is configured to refresh and display the object prompt identifier based on a time interval at which the sound source object produces sounds and the relationship between the first location and the second location.

In a possible implementation, the apparatus further includes:
- a deletion module, configured to delete the object prompt identifier in response to that a time length in which the object prompt identifier is not refreshed and displayed exceeds a time length threshold.

In a possible implementation, the deletion module is configured to: perform, in response to that a difference between a latest refresh time of the object prompt identifier and a current time exceeds the time length threshold, decreasing a transparency of the object prompt identifier by a preset gradient until the transparency of the object prompt identifier is zero.

In conclusion, the object prompting apparatus in a virtual scene provided in this embodiment of this application is applied to a computer device. The object prompt identifier is displayed in the compass information in the virtual scene picture, and the object prompt identifier is used for indicating the relationship between the first virtual object and the second virtual object in the virtual scene. This overcomes a problem that display of the object prompt identifier is limited due to an area limitation of the display region, thereby improving a display effect of the object prompt identifier of the sound source object, improving a prompt effect of the location of the virtual object, improving determining efficiency of determining the location of the virtual object, and further improving interaction efficiency of the virtual scene interface.

Figure 17:
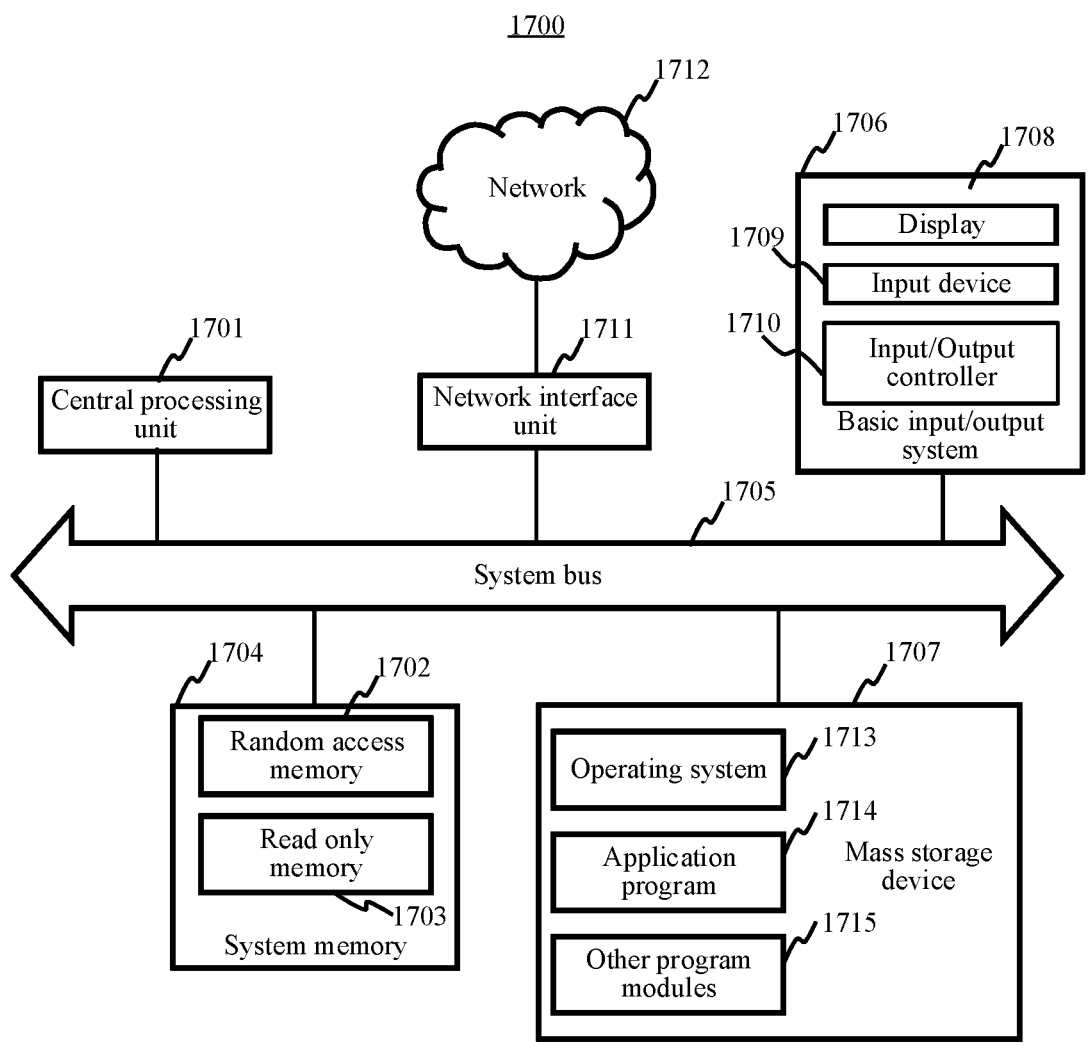
FIG. 17 is a structural block diagram of a computer device according to an embodiment.

FIG. 17 is a structural block diagram of a computer device 1700 according to an embodiment. The computer device may be implemented as the server in the foregoing solution of this application.

The computer device 1700 includes a central processing unit (CPU) 1701, a system memory 1704 including a random access memory (RAM) 1702 and a read-only memory (ROM) 1703, and a system bus 1705 connected to the system memory 1704 and the central processing unit 1701. The computer device 1700 further includes a basic input/output system (I/O system) 1706 configured to transmit information between components in the computer, and a mass storage device 1707 configured to store an operating system 1713, an application 1714, and another program module 1715.

The basic input/output system 1706 includes a display 1708 configured to display information and an input device 1709 such as a mouse and a keyboard for a user to input information. The display 1708 and the input device 1709 are both connected to the central processing unit 1701 through an input/output controller 1710 connected to the system bus 1705. The basic I/O system 1706 may further include the I/O controller 1710 for receiving and processing input from a plurality of other devices such as a keyboard, a mouse, an electronic stylus, or the like. Similarly, the input/output controller 1710 further provides output to a display screen, a printer, or other types of output devices.

The mass storage device 1707 is connected to the CPU 1701 through a mass storage controller (not shown) connected to the system bus 1705. The mass storage device 1707 and an associated computer-readable medium provide non-volatile storage for the computer device 1700. That is, the mass storage device 1707 may include a computer-readable medium (not shown) such as a hard disk or a compact disc ROM (CD-ROM) drive.

In general, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable read-only memory (EPROM), an electrically erasable programmable read-only memory (EEPROM), a flash memory, or another solid-state storage technology, a CD-ROM, a digital versatile disc (DVD), or another optical storage, magnetic tape cassette, magnetic tape, magnetic disk storage, or another magnetic storage device. Certainly, those skilled in the art may learn that the computer storage medium is not limited to the above. The system memory 1704 and the mass storage device 1707 described above may be collectively referred to as memory.

According to the embodiments of the present disclosure, the computer device 1700 may be further connected, through a network such as the Internet, to a remote computer on the network, and run. That is, the computer device 1700 may be connected to a network 1712 by using a network interface unit 1711 connected to the system bus 1705, or may be connected to another type of network or a remote computer system (not shown) by using a network interface unit 1711.

The memory further includes at least one instruction, at least one program, a code set, or an instruction set. The at least one instruction, the at least one program, the code set, or the instruction set is stored in the memory. A central processing unit 1701 executes the at least one instruction, at least one program, a code set, or an instruction set to implement all or part of steps in the flowchart of the object prompting method in a virtual scene in the foregoing embodiments.

Figure 18:
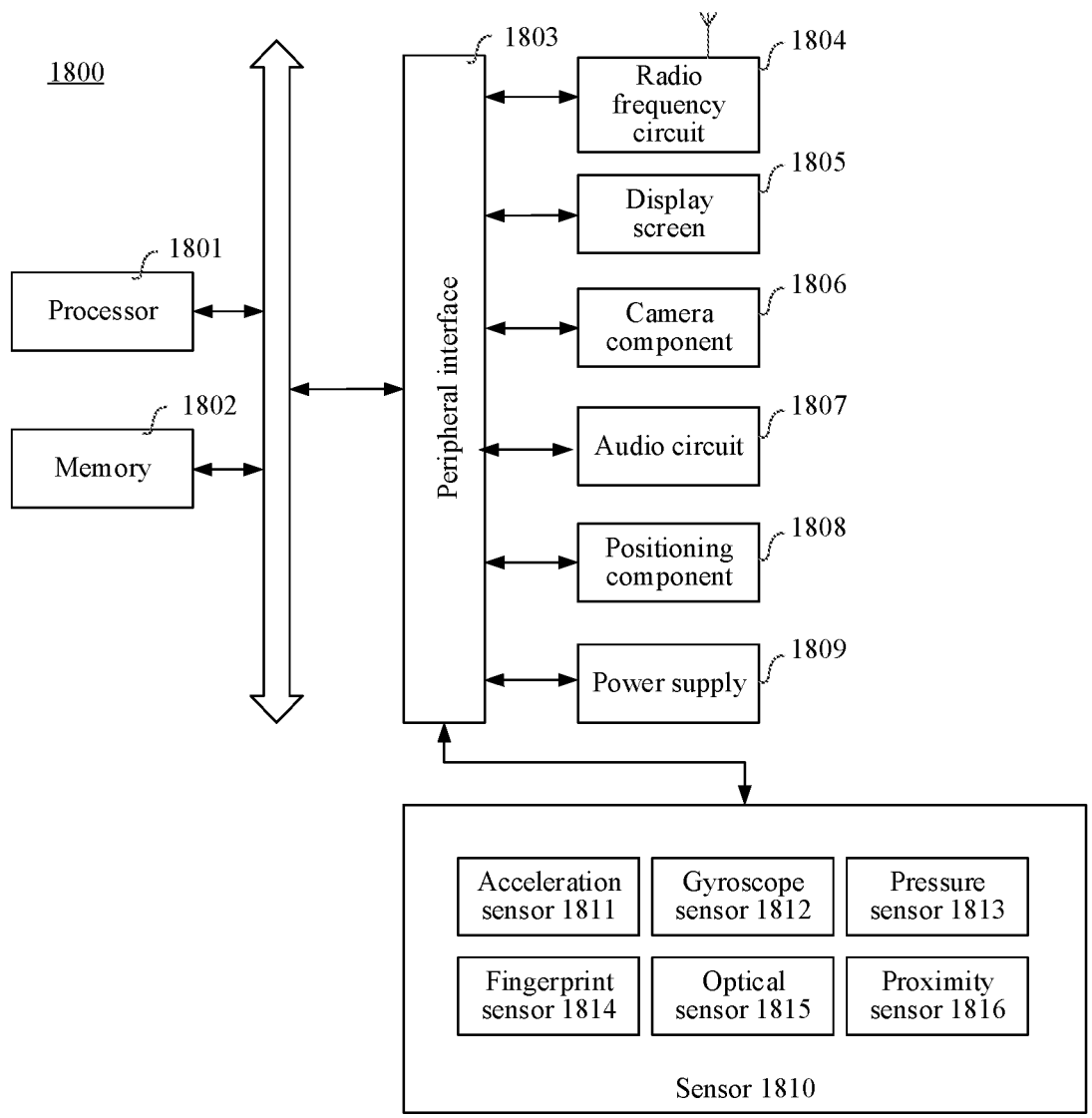
FIG. 18 is a structural block diagram of a computer device according to an embodiment.

FIG. 18 is a structural block diagram of a computer device 1800 according to an embodiment. The computer device 1800 may be a terminal such as a smartphone, a tablet computer, a Moving Picture Experts Group Audio Layer III (MP3) player, a Moving Picture Experts Group Audio Layer IV (MP4) player, a notebook computer, or a desktop computer. The computer device 1800 may also be referred to as another name such as user equipment, a portable terminal, a laptop terminal, or a desktop terminal.

Generally, the computer device 1800 includes: a processor 1801 and a memory 1802.

The processor 1801 may include one or more processing cores, such as a 4-core processor or an 8-core processor. The processor 1801 may be implemented by at least one hardware form in a digital signal processing (DSP), a field-programmable gate array (FPGA), and a programmable logic array (PLA). The processor 1801 may also include a main processor and a co-processor. The main processor is a processor for processing data in a wake-up state, also referred to as a central processing unit (CPU). The coprocessor is a low power consumption processor configured to process data in a standby state. In some embodiments, the processor 1801 may be integrated with a graphics processing unit (GPU). The GPU is configured to be responsible for rendering and drawing content that a display screen needs to display. In some embodiments, the processor 1801 may also include an AI processor for processing computing operations related to machine learning.

The memory 1802 may include one or more computer-readable storage media, which may be non-transitory. The memory 1802 may also include a high-speed random access memory, as well as non-volatile memory, such as one or more disk storage devices and flash storage devices. In some embodiments, the non-transient computer-readable storage medium in the memory 1802 is configured to store at least one instruction. The at least one instruction is executed by the processor 1801 to perform the object prompting method in a virtual scene provided in the method embodiment in this application.

In some embodiments, the computer device 1800 may further include: a peripheral device interface 1803 and at least one peripheral device. The processor 1801, the memory 1802, and the peripheral device interface 1803 may be connected by using a bus or a signal cable. Each peripheral device may be connected to the peripheral device interface 1803 by using a bus, a signal cable, or a circuit board. Specifically, the peripheral device includes: at least one of a radio frequency circuit 1804, a display screen 1805, a camera component 1806, an audio circuit 1807, a positioning component 1808, and a power supply 1809.

In some embodiments, the computer device 1800 further includes one or more sensors 1810. The one or more sensors 1810 include but are not limited to: an acceleration sensor 1811, a gyroscope sensor 1812, a pressure sensor 1813, a fingerprint sensor 1814, an optical sensor 1815, and a proximity sensor 1816.

A person skilled in the art may understand that the structure shown in FIG. 18 does not constitute any limitation on the computer device 1800, and the computer device may include more components or fewer components than those shown in the figure, or some components may be combined, or a different component deployment may be used.

In an embodiment, a non-temporary computer-readable storage medium including an instruction is further provided, for example, a memory including at least one instruction, at least one program, a code set, or an instruction set. The at least one instruction, the at least one program, the code set, or the instruction set may be executed by a processor to implement all or some steps of the method shown in an embodiment corresponding to FIG. 2 or FIG. 4. For example, the non-transitory computer-readable storage medium may be a ROM, a RAM, a CD-ROM, a magnetic tape, a floppy disk, an optical data storage device, or the like.

In an embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform all or some steps of the method shown in any embodiment in FIG. 2 or FIG. 4.

After considering the specification and practicing the present disclosure, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application. The foregoing descriptions are merely optional embodiments of this application, and the scope and spirit of this application are pointed out in the following claims.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. It is to be understood that this application is not limited to the precise structures described above and shown in the accompanying drawings, and various modifications and changes can be made without departing from the scope of this application. The scope of this application is limited by the appended claims only.

What is claimed is:

1. An object prompting method in a virtual scene, performed by a computer device, the method comprising:
   displaying a virtual scene picture corresponding to a first point of view from a first virtual object;
   superimposing and displaying compass information on the virtual scene picture, wherein there is a first azimuth scale in the compass information that indicates an orientation of the first virtual object in the virtual scene; and
   in response to a sound source object producing a sound in the virtual scene,
      acquiring a first location of the first virtual object in the virtual scene and a second location of the sound source object in the virtual scene;
      determining a spatial relationship between the first location and the second location in the virtual scene; and
      displaying an object prompt identifier near the compass information based on the spatial relationship, wherein there is a second azimuth scale in the compass information corresponding to the object prompt identifier that indicates a presence of a sound source producing a sound in a direction consistent with the spatial relationship between the first location and the second location in the virtual scene.

2. The method according to claim 1, wherein the spatial relationship between the first location and the second location comprises a distance relationship and an azimuthal relationship; and
   displaying the object prompt identifier near the compass information based on the spatial relationship comprises:
   determining a display attribute of the object prompt identifier based on the distance relationship between the first location and the second location;
   determining the second azimuth scale based on the azimuthal relationship between the first location and the second location; and
   displaying the object prompt identifier near the compass information according to the display attribute and the second azimuth scale.

3. The method according to claim 2, wherein determining the display attribute comprises:
   acquiring a target distance between the first location and the second location; and
   determining, according to a mapping relationship between the target distance and the display attribute, the display attribute of the object prompt identifier in the compass information.

4. The method according to claim 2, wherein the display attribute comprises at least one of a size of the object prompt identifier, a display transparency of the object prompt identifier, a color of the object prompt identifier, and a display shape of the object prompt identifier.

5. The method according to claim 2, wherein determining the second azimuth scale based on the azimuthal relationship comprises:
   acquiring an azimuth angle of the second location relative to the first location; and
   determining the second azimuth scale based on the azimuth angle.

6. The method according to claim 5, wherein displaying the object prompt identifier according to the display attribute and the second azimuth scale comprises:
   in accordance with a determination that the azimuth angle exceeds a display angle threshold of the compass information:
   displaying object prompt identifier indication information according to the display attribute and the second azimuth scale, wherein the object prompt identifier indication information indicates that the object prompt identifier exists outside the display angle threshold of the compass information, and wherein the display angle threshold indicates a maximum angle range that can be displayed by the compass information that centers on the orientation of the first virtual object.

7. The method according to claim 1, wherein the displaying an object prompt identifier near the compass information based on the spatial relationship comprises:
acquiring a camp to which each of the first virtual object and the sound source object belongs; and
in accordance with a determination that the first virtual object and the sound source object are in different camps:
displaying the object prompt identifier near the compass information based on the spatial relationship.

8. The method according to claim 1, wherein the displaying an object prompt identifier near the compass information based on the spatial relationship comprises:
acquiring a sound type of the sound produced by the sound source object, wherein the sound type indicates a sound production manner; and
displaying the object prompt identifier near the compass information according to the sound type and based on the spatial relationship between the first location and the second location, wherein different sound types correspond to different types of object prompt identifiers.

9. The method according to claim 1, wherein the displaying an object prompt identifier near the compass information based on the spatial relationship comprises:
refreshing and displaying the object prompt identifier near the compass information based on a time interval at which the sound source object produces sounds and the spatial relationship between the first location and the second location.

10. The method according to claim 9, wherein the method further comprises:
in accordance with a determination that a time length in which the object prompt identifier is not refreshed and displayed exceeds a time length threshold:
deleting the object prompt identifier.

11. The method according to claim 10, wherein deleting the object prompt identifier comprises:
in accordance with a determination that a difference between a latest refresh time of the object prompt identifier and a current time exceeds the time length threshold:
decreasing a transparency of the object prompt identifier using a preset gradient until the transparency of the object prompt identifier is zero.

12. An electronic device, comprising:
one or more processors; and
memory storing one or more programs, the one or more programs comprising instructions that, when executed by the one or more processors, cause the one or more processors to perform operations comprising:
displaying a virtual scene picture corresponding to a first point of view from a first virtual object;
superimposing and displaying compass information on the virtual scene picture, wherein there is a first azimuth scale in the compass information that indicates an orientation of the first virtual object in the virtual scene; and
in response to a sound source object producing a sound in the virtual scene,
acquiring a first location of the first virtual object in the virtual scene and a second location of the sound source object in the virtual scene;
determining a spatial relationship between the first location and the second location in the virtual scene; and
displaying an object prompt identifier near the compass information based on the spatial relationship, wherein there is a second azimuth scale in the compass information corresponding to the object prompt identifier that indicates a presence of a sound source producing a sound in a direction consistent with the spatial relationship between the first location and the second location in the virtual scene.

13. The electronic device according to claim 12, wherein the spatial relationship between the first location and the second location comprises a distance relationship and an azimuthal relationship; and
displaying the object prompt identifier near the compass information based on the relationship comprises:
determining a display attribute of the object prompt identifier based on the distance relationship between the first location and the second location;
determining the second azimuth scale based on the azimuthal relationship between the first location and the second location; and
displaying the object prompt identifier near the compass information according to the display attribute and the second azimuth scale.

14. The electronic device according to claim 12, wherein the displaying an object prompt identifier near the compass information based on the spatial relationship comprises:
refreshing and displaying the object prompt identifier near the compass information based on a time interval at which the sound source object produces sounds and the spatial relationship between the first location and the second location.

15. The electronic device according to claim 12, wherein the displaying an object prompt identifier near the compass information based on the spatial relationship comprises:
acquiring a camp to which each of the first virtual object and the sound source object belongs; and
in accordance with a determination that the first virtual object and the sound source object are in different camps:
displaying the object prompt identifier near the compass information based on the spatial relationship.

16. A non-transitory computer-readable storage medium, storing a computer program, the computer program, when executed by one or more processors of an electronic device, cause the one or more processors to perform operations comprising:
displaying a virtual scene picture corresponding to a first point of view from a first virtual object;
superimposing and displaying compass information on the virtual scene picture, wherein there is a first azimuth scale in the compass information that indicates an orientation of the first virtual object in the virtual scene; and
in response to a sound source object producing a sound in the virtual scene,
acquiring a first location of the first virtual object in the virtual scene and a second location of the sound source object in the virtual scene;
determining a spatial relationship between the first location and the second location in the virtual scene; and displaying an object prompt identifier near the compass information based on the spatial relationship, wherein there is a second azimuth scale in the compass information corresponding to the object prompt identifier that indicates a presence of a sound source producing a sound in a direction consistent with the spatial relationship between the first location and the second location in the virtual scene.

17. The non-transitory computer-readable storage medium according to claim 16, wherein the displaying an object prompt identifier near the compass information based on the spatial relationship comprises:

acquiring a camp to which each of the first virtual object and the sound source object belongs; and in accordance with a determination that the first virtual object and the sound source object are in different camps:

displaying the object prompt identifier near the compass information based on the spatial relationship.

* * * * *